United States Patent
Aparin et al.

(10) Patent No.: US 9,092,736 B2
(45) Date of Patent: Jul. 28, 2015

(54) COMMUNICATION AND SYNAPSE TRAINING METHOD AND HARDWARE FOR BIOLOGICALLY INSPIRED NETWORKS

(75) Inventors: Vladimir Aparin, San Diego, CA (US); Yi Tang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 12/831,540

(22) Filed: Jul. 7, 2010

(65) Prior Publication Data

US 2012/0011088 A1    Jan. 12, 2012

(51) Int. Cl.
*G06N 3/08*    (2006.01)
*G06N 3/063*    (2006.01)
*G06N 99/00*    (2010.01)
*G06N 3/02*    (2006.01)
*G06N 3/06*    (2006.01)

(52) U.S. Cl.
CPC .......... *G06N 3/0635* (2013.01); *G06N 3/02* (2013.01); *G06N 3/06* (2013.01); *G06N 3/08* (2013.01); *G06N 99/005* (2013.01)

(58) Field of Classification Search
CPC ......... G06N 3/08; G06N 3/02; G06N 99/005; G06N 3/06
USPC .................................... 706/25, 26, 33, 41, 43
See application file for complete search history.

(56) References Cited

U.S. PATENT DOCUMENTS

| | | | |
|---|---|---|---|
| 5,056,037 A * | 10/1991 | Eberhardt | 706/39 |
| 5,101,361 A * | 3/1992 | Eberhardt | 706/25 |
| 7,463,720 B2 | 12/2008 | Harding et al. | |
| 2005/0137993 A1 * | 6/2005 | Poon | 706/26 |

(Continued)

FOREIGN PATENT DOCUMENTS

JP    2010146514 A    7/2010
TW    M369528 U    11/2009

(Continued)

OTHER PUBLICATIONS

Borghetti et al. "A hybrid nanomemristor/transistor logic circuit capable of self-programming", PNAS, Feb. 2009, pp. 1699-1703.*

(Continued)

*Primary Examiner* — Jeffrey A Gaffin
*Assistant Examiner* — James F Sugent
(74) *Attorney, Agent, or Firm* — Rupit M. Patel

(57) ABSTRACT

Certain embodiments of the present disclosure support techniques for training of synapses in biologically inspired networks. Only one device based on a memristor can be used as a synaptic connection between a pair of neurons. The training of synaptic weights can be achieved with a low current consumption. A proposed synapse training circuit may be shared by a plurality of incoming/outgoing connections, while only one digitally implemented pulse-width modulation (PWM) generator can be utilized per neuron circuit for generating synapse-training pulses. Only up to three phases of a slow clock can be used for both the neuron-to-neuron communications and synapse training. Some special control signals can be also generated for setting up synapse training events. By means of these signals, the synapse training circuit can be in a high-impedance state outside the training events, thus the synaptic resistance (i.e., the synaptic weight) is not affected outside the training process.

36 Claims, 18 Drawing Sheets

(56) References Cited

U.S. PATENT DOCUMENTS

| | | | |
|---|---|---|---|
| 2008/0258767 A1* | 10/2008 | Snider et al. | 326/46 |
| 2009/0163826 A1* | 6/2009 | Mouttet | 600/544 |
| 2009/0292661 A1* | 11/2009 | Haas | 706/33 |
| 2010/0277232 A1* | 11/2010 | Snider | 327/565 |
| 2011/0004579 A1* | 1/2011 | Snider | 706/25 |

FOREIGN PATENT DOCUMENTS

| | | |
|---|---|---|
| WO | WO-2008130645 A2 | 10/2008 |
| WO | WO 2009113993 A1 * | 9/2009 |

OTHER PUBLICATIONS

Chen et al. "Implementation of Artificial Neural Network Using Counter for Weight Storage", IEEE, IFSA World Congress and 20th NAFIPS International Conference, 2001. Joint 9th, vol. 2, ISBN: 0-7803-7078-3/01, 2001, pp. 1033-1037.*

Snider, "Cortical Computing with Memristive Nanodevices", SciDAC Review, Issue 10, Winter 2008, pp. 58-65.*

Gurney, "An introduction to neural networks", UCL Press Limited, 1999, ISBN: 1-85728-503-4, pp. 1-4 and 13-15.*

Snider, "Spike-Timing Dependent Learning in Memristive Nanodevices", IEEE, International Symposium on Nanoscale Architectures, NANOARCH 2008, ISBN: 978-1-4244-2, pp. 85-92.*

Indiveri et al., "A VLSI Array of Low-Power Spiking Neurons and Bistable Synapses With Spike-Timing Dependent Plasticity", IEEE, IEEE Transactions on Neural Networks, vol. 17, Issue 1, Jan. 2006, ISSN: 1045-9227, pp. 211-221.*

G. S. Snider, "Spike-timing-dependent learning in memristive nanodevices", IEEE Int. Symp. Nanoscale Arch., pp. 85-92, Jun. 2008.

Qiong Chen, Qilun Zheng, and Weixin Ling, "Implementation of artificial neural network using counter for weight storage", in Joint 9th IFSA World Congress and 20th NAFIPS International Conference, pp. 1033-1037, vol. 2, Jul. 2001.

Taiwan Search Report—TW100124088—TIPO—Jan. 2, 2014.

* cited by examiner

COMMUNICATION AND SYNAPSE TRAINING METHOD AND HARDWARE FOR BIOLOGICALLY INSPIRED NETWORKS

BACKGROUND

1. Field

Certain embodiments of the present disclosure generally relate to neural system engineering and, more particularly, to a method and an apparatus for training of synapses in biologically inspired networks.

2. Background

In biologically inspired computing devices, communication between computational nodes (neurons) occurs through rates and relative timing of spikes. Functionality of a neural network can be represented by strengths of neuron-to-neuron connections referred to as synapses. These strengths or "synaptic weights" can be constantly adjusted by the network according to a relative timing between pre-synaptic and post-synaptic spiking.

Ideally, circuits for synaptic training are implemented such that a synaptic connection utilizes a minimal possible number of devices. This is because the number of synapses per neuron can be typically around 10,000 leading to a total number of synapses to 10 billion for a typical biological network of 1 million neurons.

A concept of one device per synapse trained by a pulse width modulation (PWM) signal has been proposed in the art for bio-inspired networks. However, a large number of channels are required for communicating between each pair of neurons. In addition, synaptic weights can be unintentionally changed outside weight-training events. These changes then need to be undone by applying opposite polarity training PWM signals. This, however, complicates implementation of the system, and leads to a high current and power consumption.

SUMMARY

Certain embodiments of the present disclosure provide an electrical circuit for interfacing two or more neuron circuits of a neural system. The electrical circuit generally includes a memristor connected between a first neuron circuit and a second neuron circuit, a pre-synaptic interface circuit connecting the first neuron circuit with the memristor and a post-synaptic interface circuit connecting the memristor with the second neuron circuit. The pre-synaptic interface circuit and post-synaptic interface circuit can include high-impedance terminations.

Certain embodiments of the present disclosure provide a method for implementing an electrical circuit interfacing two or more neuron circuits of a neural system. The method generally includes connecting a memristor between a first neuron circuit and a second neuron circuit, connecting the first neuron circuit with the memristor using a pre-synaptic interface circuit and connecting the memristor with the second neuron circuit using a post-synaptic interface circuit. The pre-synaptic interface circuit and post-synaptic interface circuit can include high-impedance terminations.

Certain embodiments of the present disclosure provide an apparatus for implementing an electrical circuit for interfacing two or more neuron circuits of a neural system. The apparatus generally includes means for connecting a memristor between a first neuron circuit and a second neuron circuit, means for connecting the first neuron circuit with the memristor using a pre-synaptic interface circuit and means for connecting the memristor with the second neuron circuit using a post-synaptic interface circuit. The pre-synaptic interface circuit and post-synaptic interface circuit can include high-impedance terminations.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Various embodiments of the disclosure are described more fully hereinafter with reference to the accompanying drawings. This disclosure may, however, be embodied in many different forms and should not be construed as limited to any specific structure or function presented throughout this disclosure. Rather, these embodiments are provided so that this disclosure will be thorough and complete, and will fully convey the scope of the disclosure to those skilled in the art. Based on the teachings herein one skilled in the art should appreciate that the scope of the disclosure is intended to cover any embodiment of the disclosure disclosed herein, whether implemented independently of or combined with any other embodiment of the disclosure. For example, an apparatus may be implemented or a method may be practiced using any number of the embodiments set forth herein. In addition, the scope of the disclosure is intended to cover such an apparatus or method which is practiced using other structure, functionality, or structure and functionality in addition to or other than the various embodiments of the disclosure set forth herein. It should be understood that any embodiment of the disclosure disclosed herein may be embodied by one or more elements of a claim.

The word "exemplary" is used herein to mean "serving as an example, instance, or illustration." Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses or objectives. Rather, embodiments of the disclosure are intended to be broadly applicable to different technologies, system configurations, networks and protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

Exemplary Neural System

Figure 1:
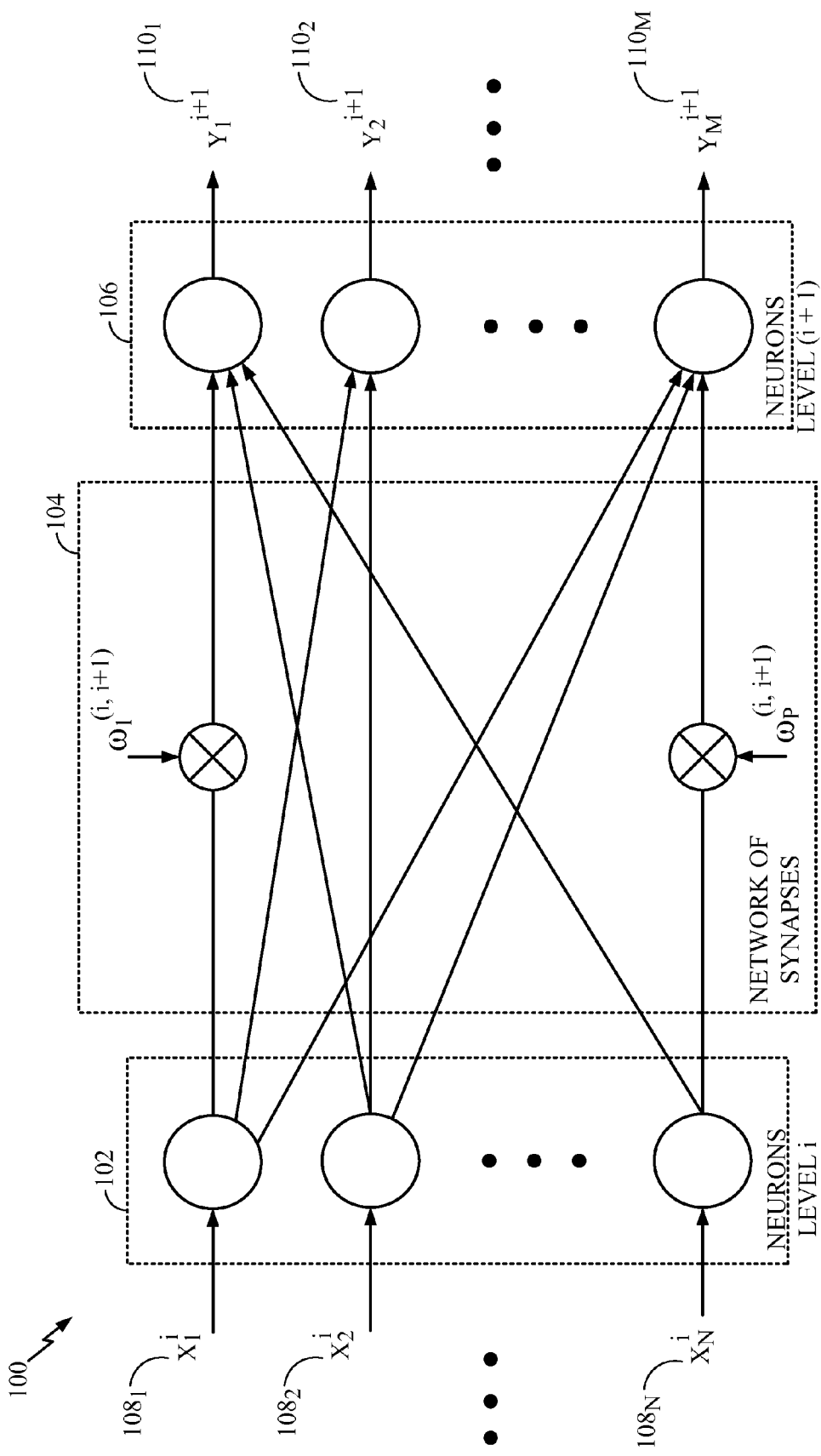
FIG. 1 illustrates an example neural system in accordance with certain embodiments of the present disclosure.

FIG. 1 illustrates an example neural system 100 with multiple levels of neurons in accordance with certain embodiments of the present disclosure. The neural system 100 may comprise a level of neurons 102 connected to another level of neurons 106 through a network of synapse connections 104. For simplicity, only two levels of neurons are illustrated in FIG. 1, although more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and output a spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons, scale those signals according to adjustable synaptic weights $w_1^{(i,i+1)}, \ldots, w_P^{(i,i+1)}$ (where P is a total number of synaptic connections between the neurons of levels 102 and 106), and combine the scaled signals as an input signal of each neuron in the level 106. Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as pattern recognition, machine learning and motor control. Each neuron in the neural system 100 may be implemented as a neuron circuit. The neuron membrane charged to the threshold value initiating the output spike may be implemented as a capacitor which integrates an electrical current that flows through it.

Certain embodiments of the present disclosure may eliminate the capacitor as the electrical current integrating device and use a memristor element in its place. This approach may be applied in neuron circuits, as well as in various other applications where bulky capacitors are utilized as electrical current integrators. With nanometer feature-sized memristors, the area of neuron circuit may be substantially reduced, which may make implementation of a very large-scale neural system hardware implementation practical.

It is proposed in the present disclosure to employ a relatively small number of devices (e.g., possibly only one device) per synaptic connection. The synaptic device may be, for example, the nanometer feature-sized memristor whose resistance can be tuned by applying a voltage across it. The memristor may be then used to pass and scale spikes between a pair of neurons. It is undesirable for the synaptic device (e.g., the memristor) to change its weight (e.g., the memristor resistance) during a spike transmission. The present disclosure solves this problem by efficiently separating the spike transmission phase from a synapse-training phase during which synaptic weights may be adjusted.

Further, according to certain aspects, synapses may be trained asymmetrically. For example, synapse weights may be increased at a higher rate compared to a rate of decreasing the weights. The present disclosure proposes an efficient method to achieve this training asymmetry, while achieving a low current and power consumption. A proposed synapse training circuit may be shared by all incoming or outgoing connections, while only one digitally implemented pulse-width modulation (PWM) generator may be utilized to generate weight-training pulses. Only up to three phases of a slow clock signal may be used for neuron-to-neuron communication and synapse training.

Certain embodiments of the present disclosure also support generating special signals for setting up synapse training events. By means of these signals, the synapse training circuit may be in the high-impedance state outside the training events, thus a synaptic resistance (i.e., a synaptic weight) may not be affected outside the weight-training process. Therefore, the high-impedance terminations may facilitate selectively changing a memristor resistance.

Exemplary Neuron Circuit and Implementation of Synapses

Figure 2:
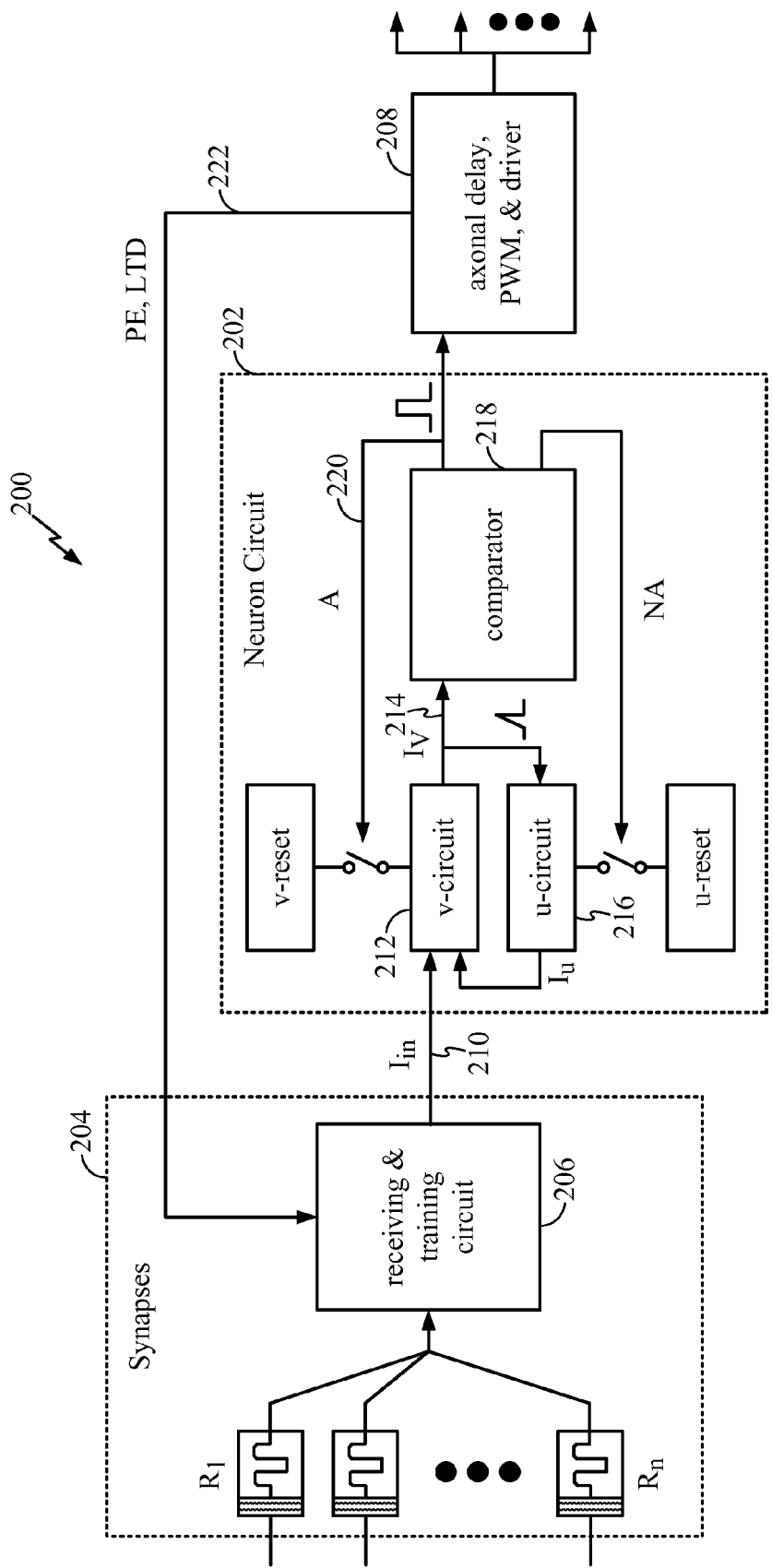
FIG. 2 illustrates an example neuron circuit with synapses and a training circuit in accordance with certain embodiments of the present disclosure.

FIG. 2 illustrates an example conceptual block diagram 200 of a neuron circuit 202, synapses 204 connected with the neuron circuit 202 as well as with synapse training circuits 206-208 in accordance with certain embodiments of the present disclosure. The synapses 204 may correspond to a portion of the synaptic network 104 from FIG. 1, and the neuron circuit 202 may be one of the level 106 neurons.

The synaptic circuit 204 may provide following operations: reception of spikes from pre-synaptic neurons (e.g., the level 102 neurons from FIG. 1), generation of an appropriately scaled electrical current for each synaptic connection, combining the scaled currents as an input current 210 of the neuron circuit 202 and storing of synaptic weights. As illustrated in FIG. 2, the synapse training circuits may be divided between a training circuit 206 and a neuron output circuit 208. The circuit 208 may comprise a pulse width modulation (PWM) generator and switches that enable training of synaptic weights.

An electrical current 214 within the neuron circuit 202 may charge a potential of an integrating element (i.e., of a u-circuit 216), wherein the integrating element mimics a membrane of a biological neuron. As aforementioned, the integrating element may be implemented based on a nanometer feature-sized memristor. When the potential of integrating element reaches a defined threshold value, a comparator 218 may be activated to generate a spike 220. The comparator output signal 220 may, for example, control various switches of the neuron circuit 202 for resetting the potential of integrating element. In addition, as illustrated in FIG. 2, the spike 220 may be utilized by the circuit 208 to generate various weight-training signals 222 for the training circuit 206, and it may be transmitted to another level of neurons (not shown in FIG. 2).

Figure 3:
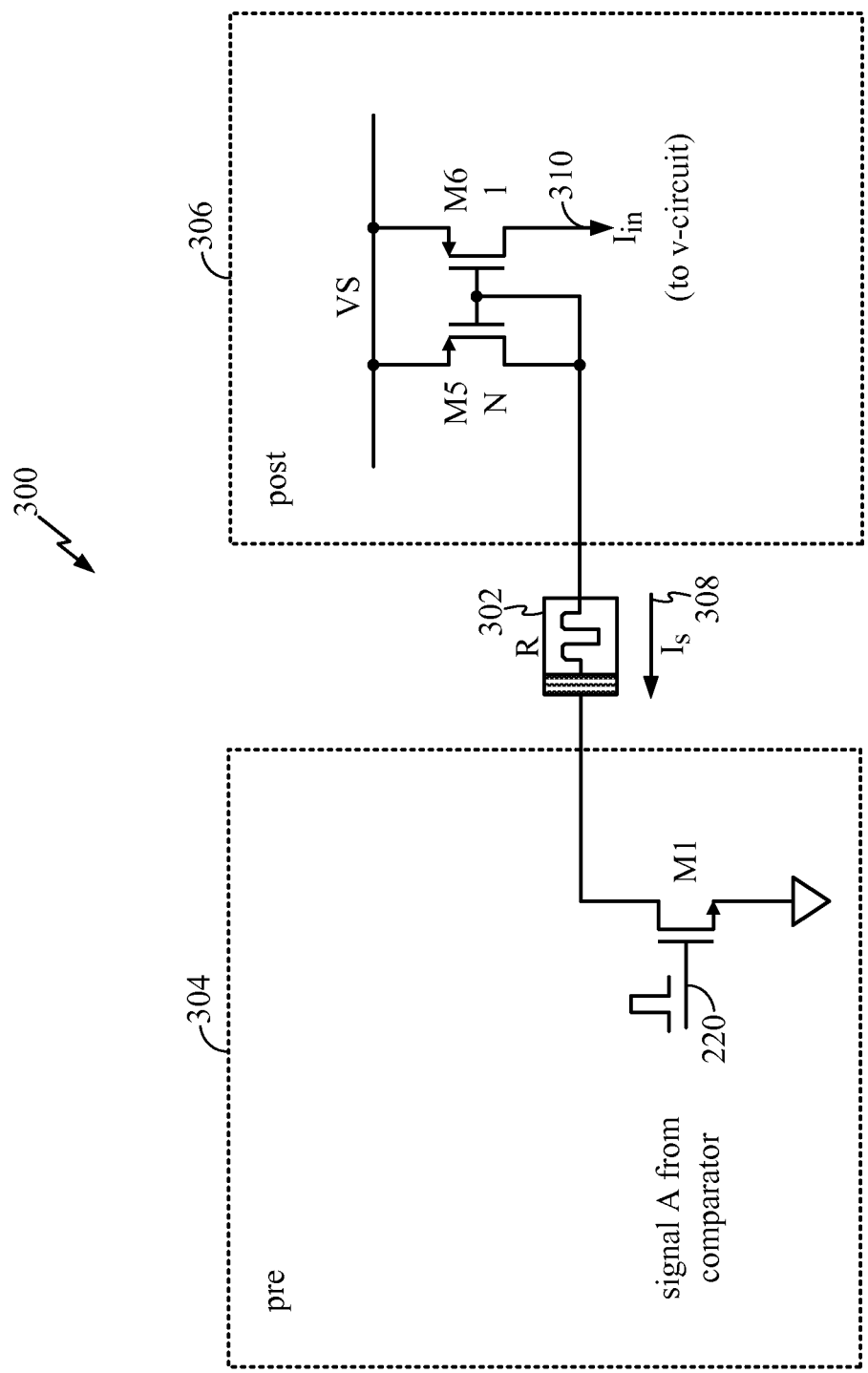
FIG. 3 illustrates an example schematic diagram of a synapse in accordance with certain embodiments of the present disclosure.

In one embodiment of the present disclosure, an electrical current in each of the synapses 204 may be generated and scaled by applying a fixed voltage across a memristor element, as illustrated in FIG. 3 for a neuron-to-neuron (synapse) connection 300. The synapse connection 300 may comprise a memristor element 302 connected between a Negative channel Field Effect Transistor (NFET) based switch M1 of a pre-synaptic interface circuit 304 and a diode-connected Positive channel Field Effect Transistor (PFET) based current sensor M5 of a post-synaptic interface circuit 306. Therefore, the single memristor element 302 may actually represent a synaptic connection between a pair of neuron circuits.

A sensed synaptic current 308 may be mirrored by a transistor M6 as an input current 310 (e.g., the input current 210 of the neuron circuit 202 illustrated in FIG. 2) of a post-synaptic v-circuit (e.g., a v-circuit 212 from FIG. 2). Neglecting a small voltage drop across the switch M1, the synaptic current 308 may be given as:

$$I_s = \frac{V_S - V_{SG5}}{R}, \quad (1)$$

where $V_S$ is a positive power supply voltage, $V_{SG5}$ is a source-gate voltage of the transistor M5, and R is a resistance of the memristor 302 (memristance) that may be varied between minimum and maximum values (i.e., between $R_{min}$ and $R_{max}$).

The voltage $V_{SG5}$ may nonlinearly depend on an electrical current through the transistor M5. However, this voltage may be linearly approximated as given by:

$$V_{SG5} \approx |V_{Tp}| + I_s/g_{m5} \quad (2)$$

where $V_{Tp}$ represents a PFET threshold voltage, and $g_{m5}$ is a transconductance of the transistor M5, which may be constant.

Substituting equation (2) into equation (1) and solving it for the synaptic current 308, the following may be obtained:

$$I_s = \frac{V_S - |V_{Tp}|}{R + 1/g_{m5}}. \quad (3)$$

From equation (3), the $I_s$ tuning range may be defined as:

$$\frac{I_{s,max}}{I_{s,min}} = \frac{R_{max} + 1/g_{m5}}{R_{min} + 1/g_{m5}}. \quad (4)$$

However, there are two main drawbacks of the synaptic current generator illustrated in FIG. 3. First, the memristance R may change during the spike transmission/reception due to the applied voltage across the synaptic memristor 302. To prevent this, the power supply voltage $V_S$ may be chosen low enough to ensure that the voltage drop across the memristor 303, $V_S - V_{SG5}$, is below a memristor threshold voltage $V_{T,mem}$.

Second, the synaptic current 308 may be much larger than that used by the v-circuit of the post-synaptic neuron. A typical memristance may vary between 1 kΩ and 20 MΩ. If $V_S$=1.2V and $V_{SG5}$=0.6V, then the synaptic current 308 may vary between 30 nA and 0.6 mA per spike, depending on a synaptic weight. On the other hand, a typical value of the input current 310 to the post-synaptic neuron may be less than 100 pA. Therefore, the electrical current mirror ratio between the transistors M5 and M6 may be at least $6 \times 10^6$, which is not practical for hardware implementation. It is better to use memristors with very large $R_{min}$ resistance to avoid generating large synaptic currents and using large mirroring ratios. However, this approach may reduce the $I_s$ tuning range defined by equation (4).

Exemplary Tuning of Synaptic Weights

Figure 4:
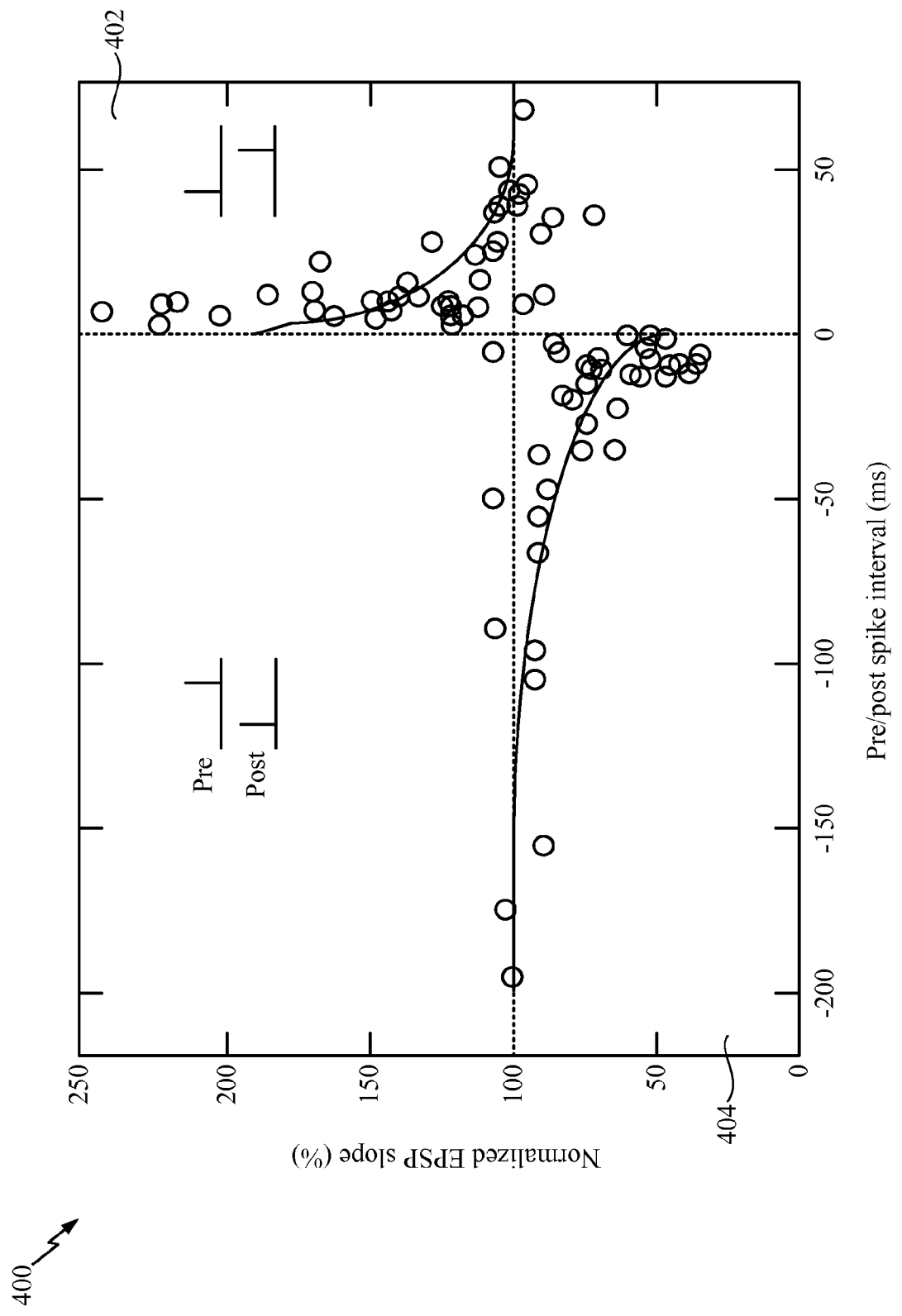
FIG. 4 illustrates an example graph diagram of synaptic weight changes as a function of relative timing of pre-synaptic and post-synaptic spikes in accordance with certain embodiments of the present disclosure.

FIG. 4 illustrates an example graph diagram 400 of a synaptic weight change (i.e., of a normalized excitatory post-synaptic potential (EPSP)) as a function of relative timing of pre-synaptic and post-synaptic spikes in accordance with certain embodiments of the present disclosure. If a pre-synaptic neuron fires before a post-synaptic neuron, then a corresponding synaptic weight may be increased, as illustrated in a portion 402 of the graph 400. This weight increase can be referred as a Long-Term Potentiation (LTP) of the synapse. The reverse order of firing may reduce the synaptic weight, as illustrated in a portion 404 of the graph 400, causing a Long-Term Depression (LTD) of the synapse.

It can be observed from the graph portion 402 that the amount of LTP may decrease roughly exponentially as a function of difference between pre-synaptic and post-synaptic spike times with a time constant of the same order as a typical neuron membrane time constant. This may assure that only those pre-synaptic spikes arriving within the temporal range over which a neuron integrates its inputs may be potentiated, further enforcing the requirement of causality.

As illustrated in FIG. 4, the synaptic weight-training curve may be asymmetrical. The LTP weight increment represented by the graph portion 402 may be larger for short inter-spike intervals, but it may decay faster (e.g., decaying within 40 ms) than the LTD weight increment (e.g., decaying within 150 ms, as illustrated in FIG. 4 by the graph portion 404). The dominance of LTD outside the causality window may cause weakening of synapses when pre-synaptic spikes occur randomly in time with respect to post-synaptic action potentials. Therefore, these random events may not consistently contribute evoking the synapses.

Exemplary Synapse Training Circuit and PWM Generator—Single Slow Clock Signal

Certain embodiments of the present disclosure provide a digital implementation of a synapse weight-training circuit, wherein a counter may be utilized to measure a time interval between pre-synaptic and post-synaptic spikes in increments of a clock period. Two clocks may be employed: a slow clock and a fast clock. Pulses of the slow clock may represent spikes and may be also used as synapse-training windows. The time between pre-synaptic and post-synaptic spikes may be measured in multiples of the slow-clock period.

The fast clock may be utilized for generating pulse width modulation (PWM) training signals, which may fit within the slow-clock pulses. A width of each PWM pulse may correspond to a time difference between two successive pre-synaptic and post-synaptic spikes. If the time interval between spikes is larger, then the pulse width may be smaller, and vice-versa. The width of PWM pulse may represent a window during which a synapse weight may be adjusted (trained).

The slow-clock period may be equal to or only slightly smaller than the shortest spike duration and the shortest inter-spike interval. The slow-clock frequency may correspond to a Nyquist rate of a maximum firing rate. The neuron circuit 202 from FIG. 2 may generate, for example, 0.5 ms-wide spikes with 0.5 ms shortest inter-spike interval. Therefore, the appropriate slow-clock frequency may be equal to 2 kHz. In order to achieve the finest resolution over, for example, 8 ms interval using the 2 kHz clock, it may be sufficient to employ a four-bit counter for a pulse-width modulator, which may be clocked at the fast-clock frequency of, for example, 32 kHz.

A synapse training circuit proposed in the present disclosure may be shared by all synapses connected to the same neuron input or to the same neuron output. The communication between pre-synaptic and post-synaptic neurons may occur on two phases of the slow clock. During the clock-high phase, only a spike may be transmitted and received between the neurons. During the clock-low phase, either a Training Enable (TE) signal or a PWM training signal may be transmitted. These signals may never overlap with the spike signal. The communication between the neurons may occur in the voltage domain by closing and opening appropriate switches on both sides of a corresponding synaptic memristor.

Figure 5A:
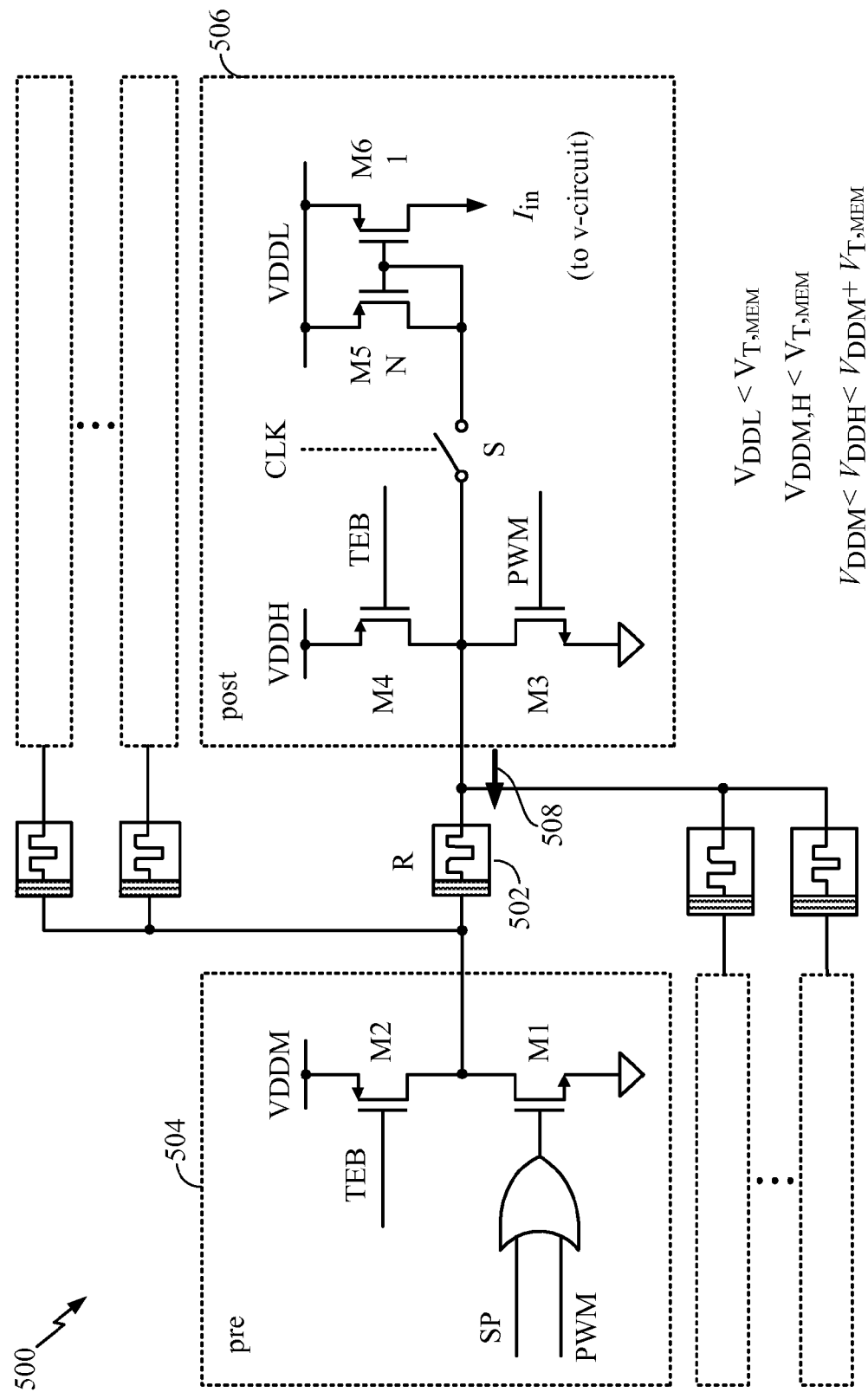
FIGS. 5A-5B illustrate an example of synapse-training implementation in accordance with certain embodiments of the present disclosure.
Figure 5B:
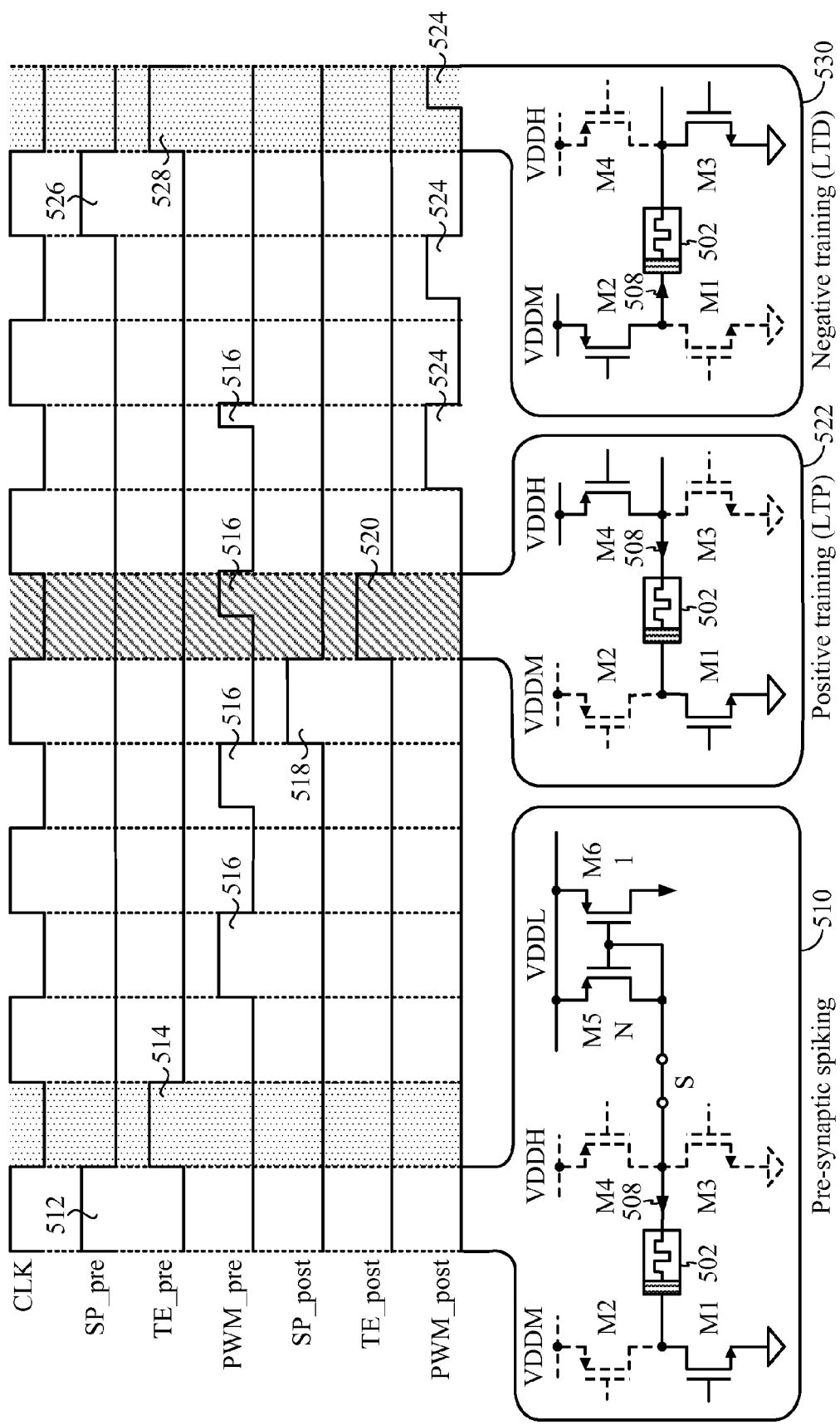

FIG. 5 illustrates an example synaptic interface 500 with one memristor per synapse in accordance with certain embodiments of the present disclosure. It can be observed that one synaptic connection may be implemented as a single memristor element 502. As illustrated in FIG. 5, a pre-synaptic training circuit 504 may be shared by all synapses connected to the same post-synaptic neuron. Also, a post-synaptic training circuit 506 may be shared by all synapses connected to the same pre-synaptic neuron. Transistors M1-M4 may represent switches, and transistors M5-M6 may represent synaptic current sensors. In addition, a switch S may be controlled by the slow clock signal CLK.

During spike transmission and reception, the switches M1 and S may be on, the switches M2-M4 may be off, and the transistor M5 may self-bias to accommodate a synaptic current 508 flowing through the memristor 502. A spike that is transmitted/received between a pair of neuron circuits may be a pre-synaptic spike, which is illustrated in FIG. 5 as a pulse 512. This pre-synaptic spiking event is also illustrated by a circuit 510, which represents a portion of the circuit 500 associated with this particular event. The voltage drop across the memristor 502, $V_{DDL}-V_{GS5}$, may be below a memristor threshold voltage $V_{T,mem}$ so that the memristance may not change during this event. An electrical current flowing through the transistor M5 may be proportional to the synaptic current 508, and may be mirrored into an input current $I_{in}$ of a post-synaptic neuron.

Immediately following the spike 512, a training enable (TE) pulse 514 may be generated by the pre-synaptic neuron on the clock-low phase of the same clock cycle, and the switch S may be turned off. The TE pulse 514 may turn the switch M2 on, if there is a PWM training signal applied to the switch M3 of a post-synaptic neuron. The pre-synaptic TE pulse 514 may also restart a pre-synaptic PWM generator, whose PWM pulses 516 may appear on the clock-low phases at the gate of the switch M1, as illustrated in FIG. 5.

When a post-synaptic neuron spikes (e.g., represented by a pulse 518), this neuron may generate a TE pulse 520 on the next clock-low phase, as illustrated in FIG. 5. If a pre-synaptic neuron is still generating its PWM signals (e.g., pulses 516), then the post-synaptic TE pulse 520 may be aligned with one of the PWM pulses 516. This synapse weight-training event is illustrated by a circuit 522, which represents a portion of the circuit 500 associated with this particular event. The switches M1 and M4 may be on at the same time for duration of one of the pre-synaptic PWM pulses 516 aligned with the TE pulse 520. All other switches in the circuit 522 may be off.

The voltage across the memristor 502 may be approximately $V_{DDH}>V_{T,mem}$, which may represent the highest power supply voltage in the system 500. Then, the synaptic current 508 may flow through the memristor 502 during the aligned PWM pulse 516 in a direction illustrated in the circuit 522 causing the memristance to increase, which may result in the LTP of the synaptic connection (i.e., the synapse weight may be increased). In addition, the post-synaptic TE pulse 520 may restart a post-synaptic PWM generator, whose PWM pulses 524 may appear on the clock-low phases at the gate of the M3 switch, as illustrated in FIG. 5. The pre-synaptic and post-synaptic PWM generators may correspond to the same apparatus, and may drive both M1 and M3 switches of the same neuron.

When a pre-synaptic neuron spikes (e.g., represented by a pulse 526), this neuron may generate a TE pulse 528 on the next clock-low phase, as illustrated in FIG. 5. If a post-synaptic neuron is still generating its PWM signals (e.g., pulses 524), then the pre-synaptic TE pulse 528 may be aligned with one of the PWM pulses 524. This training event is illustrated in FIG. 5 by a circuit 530, which represents a portion of the circuit 500 associated with this particular event. The switches M2 and M3 may be on at the same time for duration of one of the post-synaptic PWM pulses 524 aligned with the TE pulse 528. All other switches in the circuit 530 may be off.

The voltage across the memristor 502 may be approximately $V_{DDM}>V_{T,mem}$. Then, the synaptic current 508 may flow through the memristor 502 during the aligned PWM pulse 524 in a direction illustrated in the circuit 530 causing the memristance to decrease, which may result in the LTD of the synaptic connection (i.e., the synapse weight may be decreased). To implement a lower degree of depression versus potentiation for the same inter-spike interval, the power supply voltage $V_{DDM}$ may be chosen to be lower than the power supply voltage $V_{DDH}$.

If pre-synaptic and post-synaptic spikes are aligned, then TE signals of both pre-synaptic and post-synaptic training circuits may also be aligned, which may turn the switches M2 and M4 on at the same time. All other switches may be off. The voltage drop across the memristor may be then equal to $V_{DDH}-V_{DDM}$. In this case, a slight potentiation may be applied by choosing $V_{DDH}-V_{DDM}>V_{T,mem}$ or the memristance may not be changed, if it is chosen that $V_{DDH}-V_{DDM}<V_{T,mem}$.

Figure 6A:
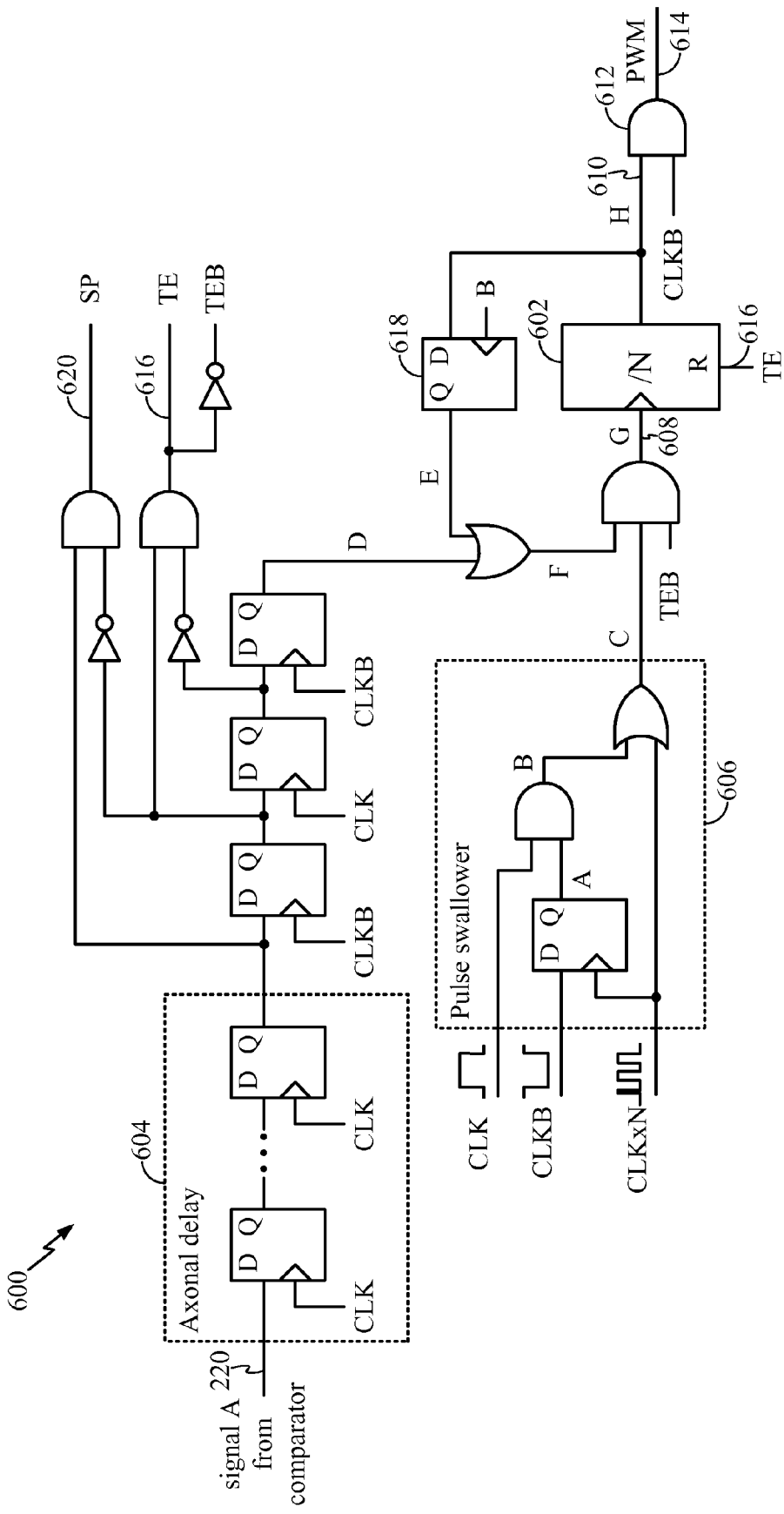
FIGS. 6A-6C illustrate an example pulse-width modulation (PWM) generator that may be used for the synapse-training implementation from FIG. 5 in accordance with certain embodiments of the present disclosure.
Figure 6B:
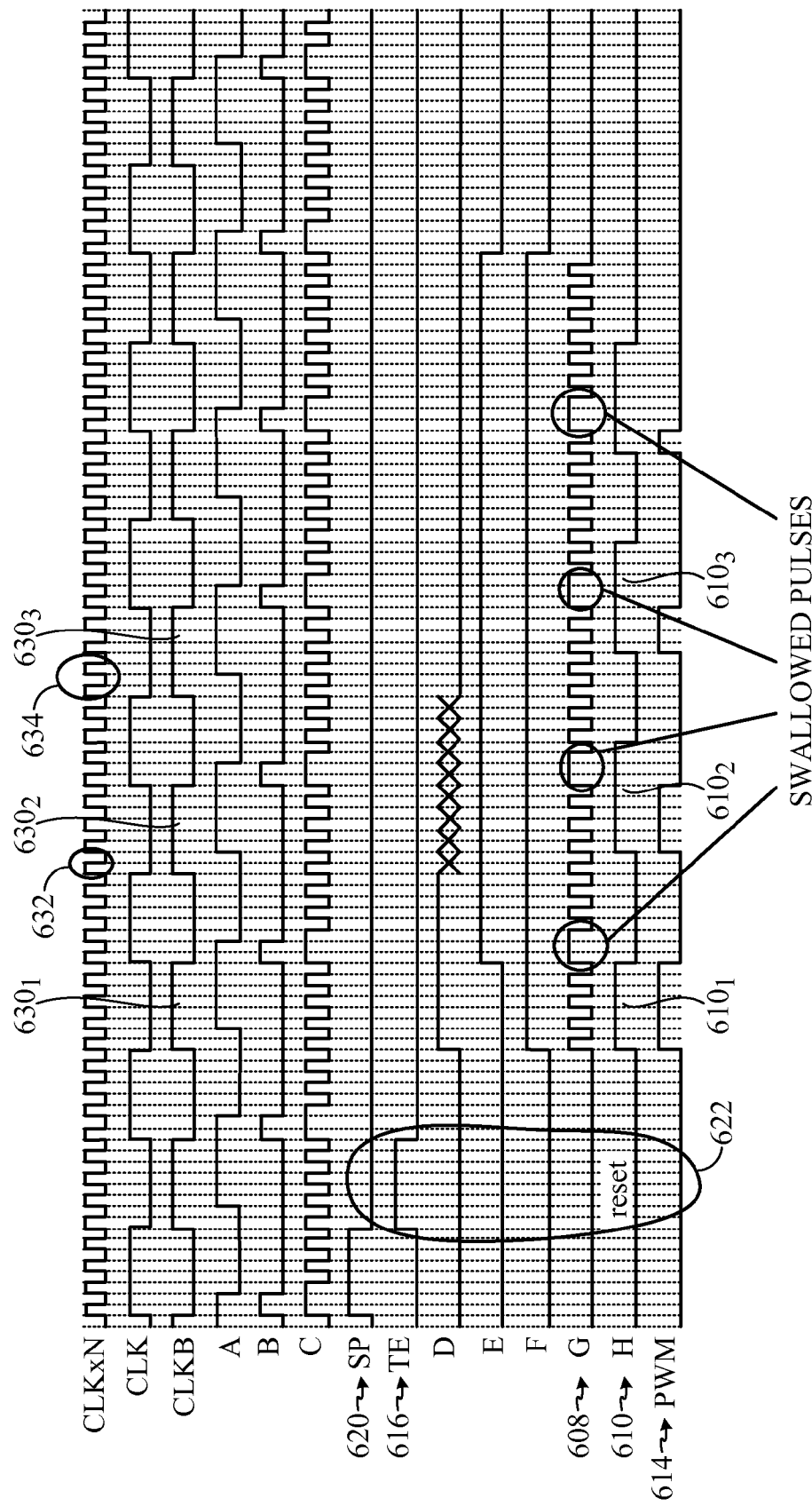
Figure 6C:
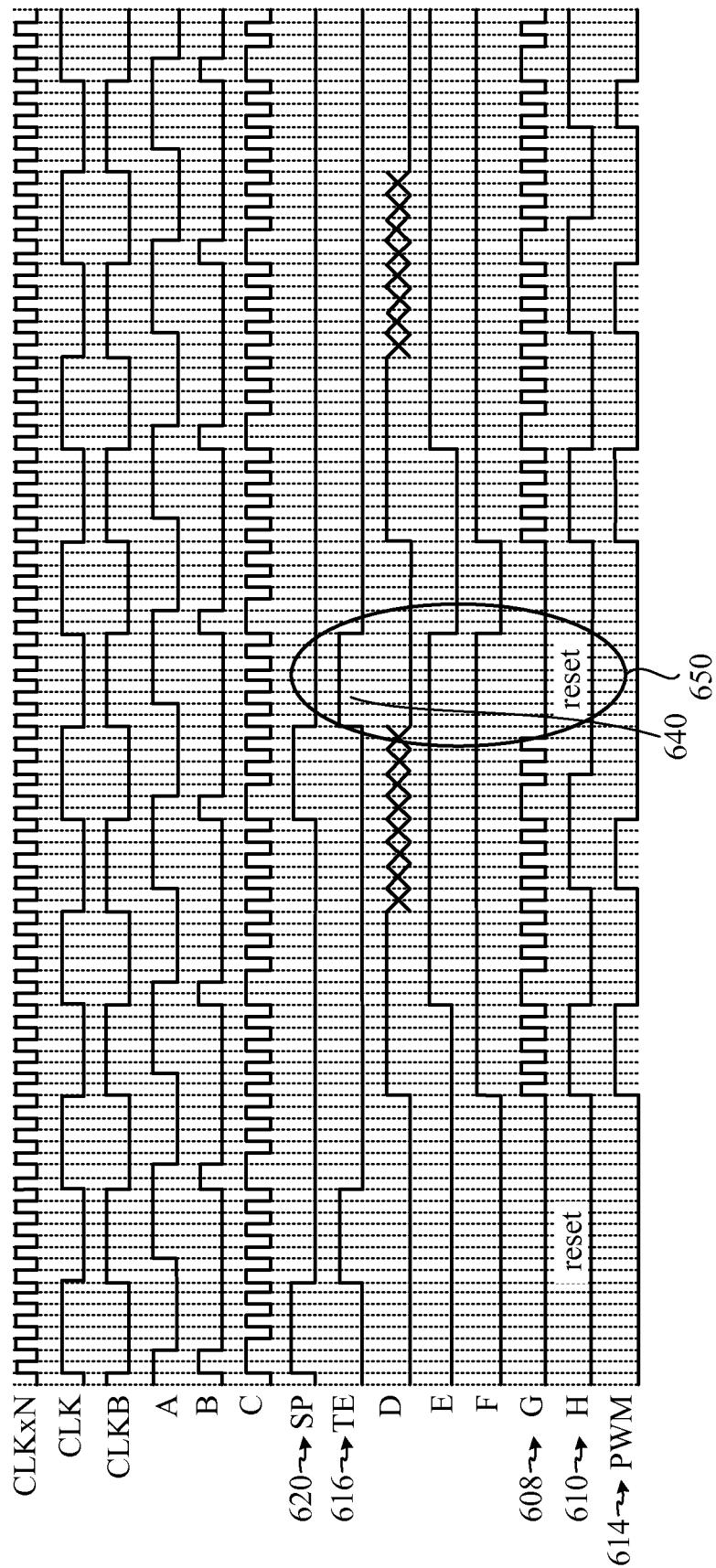

FIG. 6 illustrates an example pulse-width modulation (PWM) generator 600 that may be used for generating training signals for the neuron-to-neuron interface from FIG. 5 in accordance with certain embodiments of the present disclosure. There may exist one PWM generator 600 per neuron circuit, and it may be implemented, for example, within the neuron output circuit 208 illustrated in FIG. 2. The output signal 220 from the comparator 218 of the neuron circuit 202 may represent an input signal of the PWM generator 600, as illustrated in FIG. 6.

Implementation of the PWM generator 600 is fully digital and based on an N-divider 602, an axonal delay circuit 604, and a pulse swallower 606, as illustrated in FIG. 6. The parameter N may be equal to a ratio of a fast-clock frequency (i.e., CLK×N frequency) to a slow-clock frequency (i.e., CLK frequency). The N-divider 602 may be clocked by a signal 608 representing a fast clock with a swallowed pulse every N fast cycles (i.e., swallowed once every slow-clock cycle), as illustrated in the timing diagram of FIG. 6 for the signal 608. Without the pulse swallower 606 but with proper resetting, N-divider output pulses 610 may be aligned with the slow clock pulses.

However, by employing the pulse swallower 606, only the first pulse $610_1$ of the N-divider output signal 610 may be aligned with a pulse $630_1$ of a slow clock signal CLKB that represents the inverted slow clock signal CLK. As illustrated in FIG. 6, a second pulse $610_2$ of the N-divider output signal 610 may appear one fast-clock cycle later (a fast-clock cycle labeled as 632 in FIG. 6) than a pulse $630_2$ of the slow-clock CLKB, a third pulse $610_3$ of the N-divider output signal 610 may appear two fast-clock cycles later (fast-clock cycles labeled as 634 in FIG. 6) than a pulse $630_3$ of the slow-clock CLKB, and so on. A logical AND operation 612 between the N-divider output 610 and the slow clock CLKB signal may result in generating a PWM training signal 614.

The operation of N-divider 602 may be enabled by opening the clock gate 608 and by resetting it to zero by a TE signal 616, as illustrated in the timing diagram in FIG. 6 by an event 622 when the TE signal is equal to a logical "one." The divider 602 may count the fast-clock cycles until the end state is reached or until another TE signal is generated (e.g., a TE pulse 640 of a resetting event 650). A D flip-flop 618 may sense the last state of the N-divider 602. Other D flip-flops in FIG. 6 may be used to condition spike (SP) pulses 620 and TE pulses 616 such that they only occupy the slow-clock-high and the slow-clock-low phases, respectively.

Exemplary Synapse Training Circuit—Multiple Clock Phases

Certain embodiments of the present disclosure provide a digital implementation of the synapse weight-training circuits 206-208 illustrated in FIG. 2, wherein the slow clock may comprise more than one phase. Multiple slow-clock phases may be required to prevent current flow between two pre-synaptic neurons connected to the same post-synaptic neuron when one of the pre-synaptic neurons is activated for LTD and the other pre-synaptic neuron is activated by its LTP PWM training signal. In addition, the multiple slow-clock phases may prevent current flow between two post-synaptic neurons connected to the same pre-synaptic neuron when one of the post-synaptic neurons is activated for LTP and the other post-synaptic neuron is activated by its LTD PWM training signal. Further, the multiple slow-clock phases may better prevent changes in synaptic memristances during spike reception.

In one embodiment of the present disclosure, the slow clock may comprise three phases (i.e., CLK1, CLK2 and CLK3 phases) that define channels for communicating between neurons. Time duration between pre-synaptic and post-synaptic spikes may be measured in multiples of the slow-clock period. A fast clock may be utilized to generate PWM training signals, which may fit within the slow-clock pulses.

Figure 7:
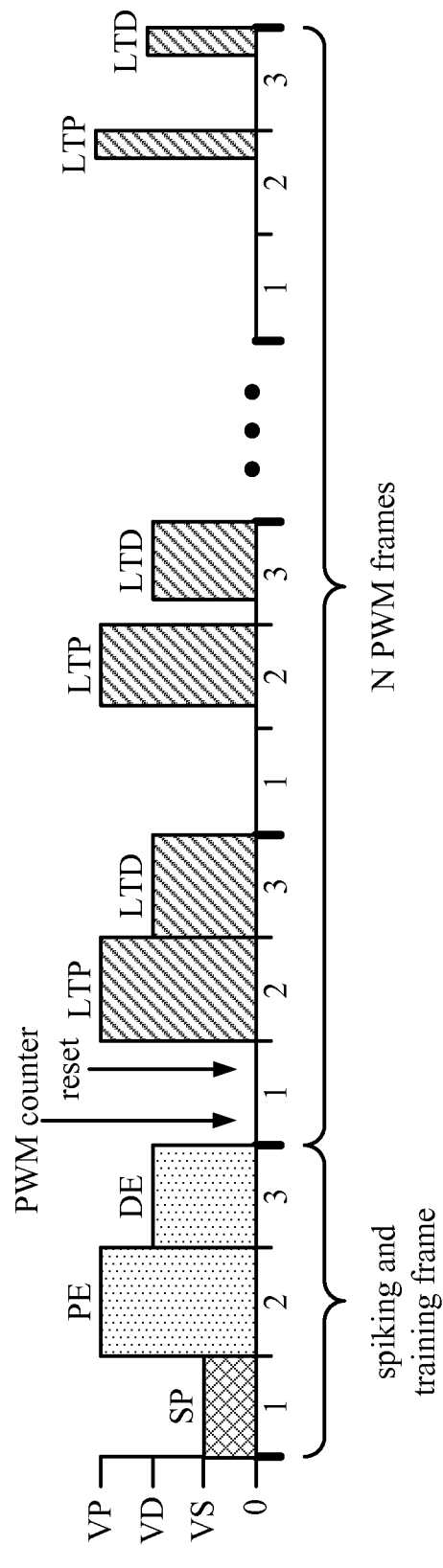
FIG. 7 illustrates an example channels for neuron-to-neuron communications in accordance with certain embodiments of the present disclosure.

The slow-clock phases may establish three communication channels, as illustrated in FIG. 7. The CLK1 phase may be utilized for spikes (SP) only, the CLK2 phase may be used for potentiation enable (PE) and LTP PWM training signals, and the CLK3 phase may be used for depression enable (DE) and LTD PWM training signals.

A slow-clock period may be equal to or only slightly less than the shortest spike duration and the shortest inter-spike interval, which may correspond to a Nyquist rate of a maximum firing rate. The neuron circuit 202 from FIG. 2 may generate 0.5 ms-wide spikes with 0.5 ms shortest inter-spike interval. Therefore, the appropriate slow-clock frequency may be 2 kHz. Since the neuron circuit may be five times faster than the actual neuron, the synaptic weight change $\Delta\omega$ may need to decay within a 8 ms window for LTP and within a 30 ms for LTP. To generate LTP training signals spanning the 8 ms interval with the period of 0.5 ms, it may be sufficient to utilize a four-bit counter for the LTP pulse-width modulator. To generate LTD training signals spanning the 30 ms interval with the period of 0.5 ms, it may be sufficient to use a six-bit counter for the LTD pulse-width modulator.

Figure 8A:
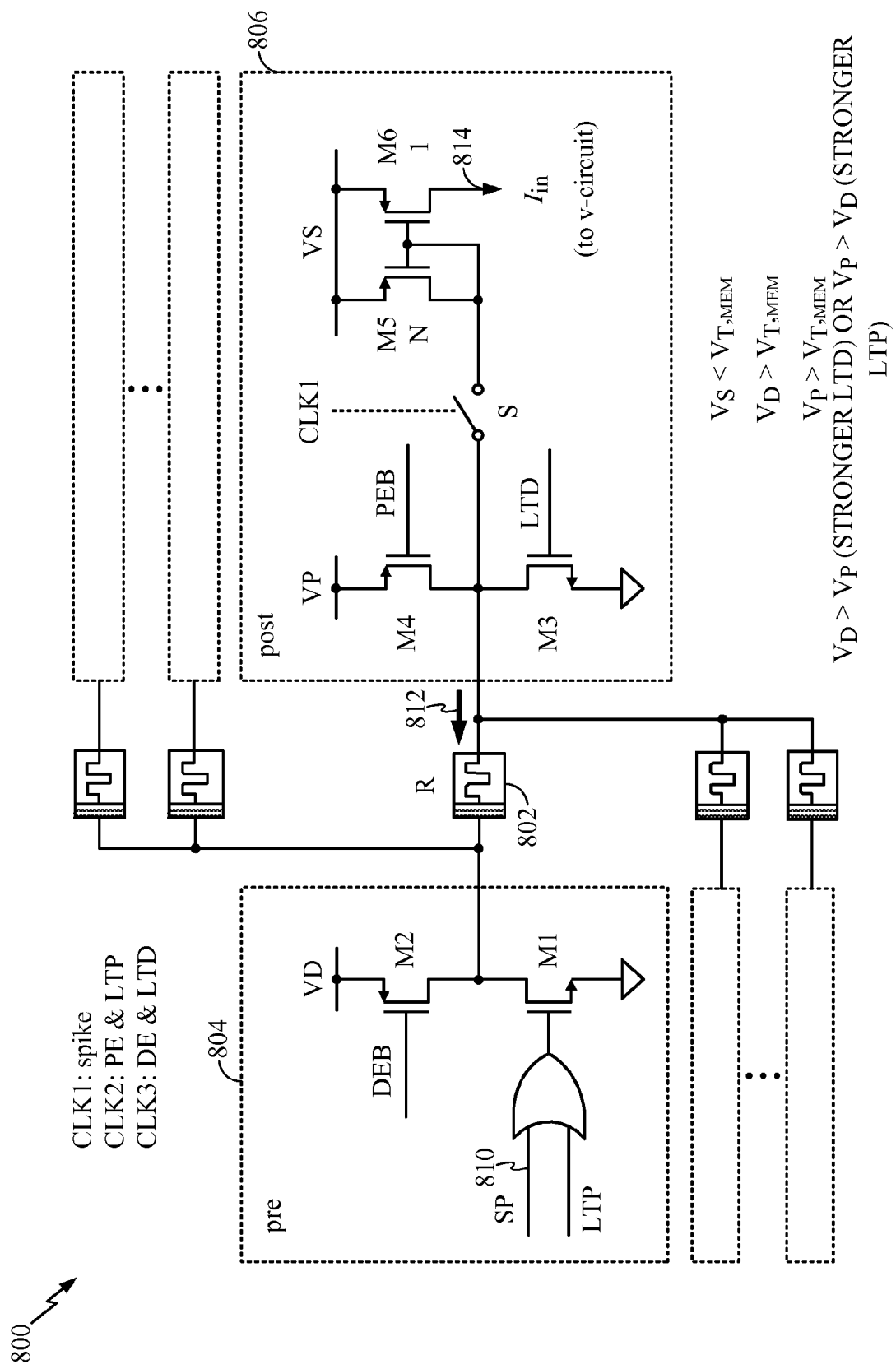
FIGS. 8A-8B illustrate another example of synapse-training implementation in accordance with certain embodiments of the present disclosure.
Figure 8B:
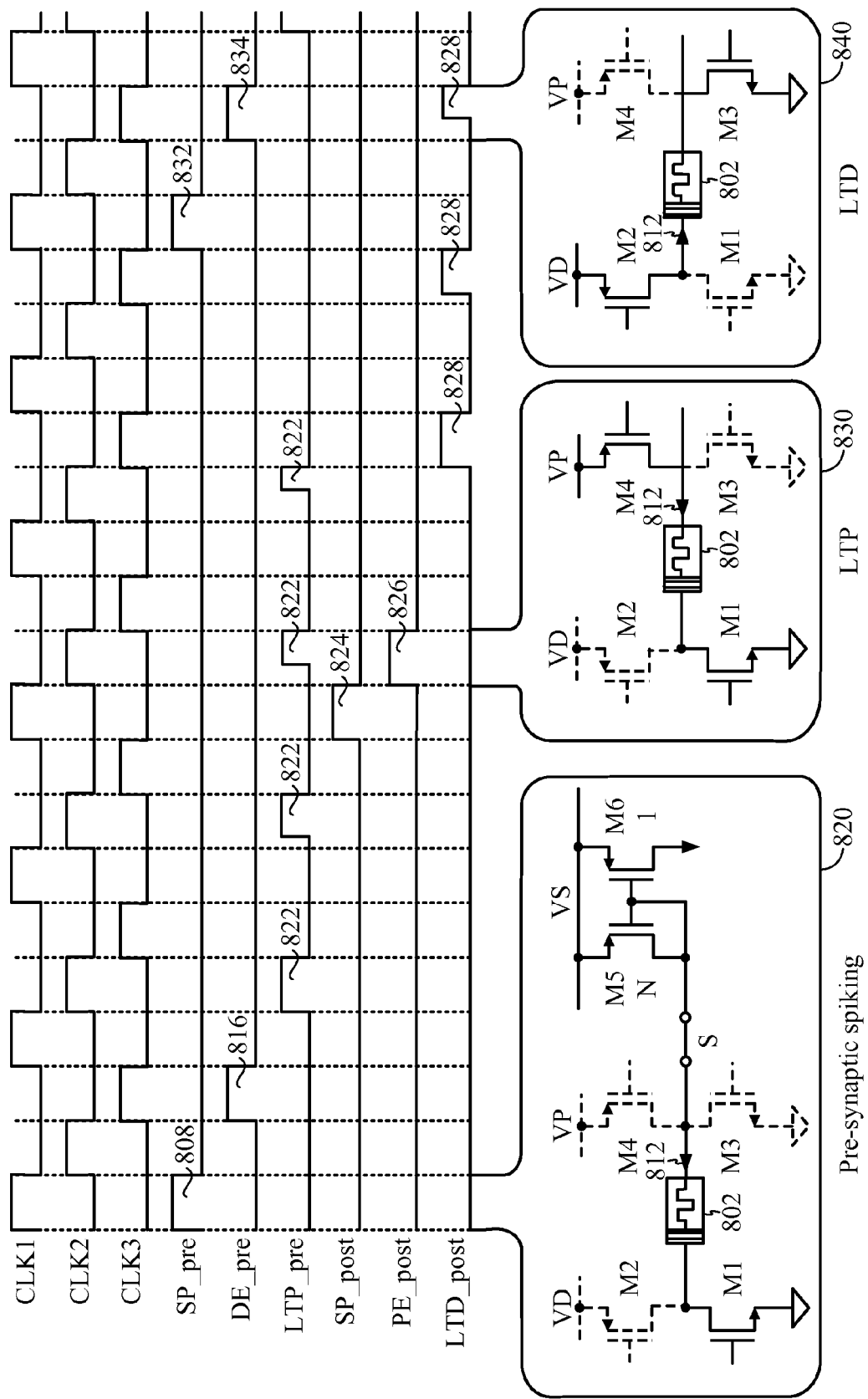

FIG. 8 illustrates an example synaptic interface 800 in accordance with certain embodiments of the present disclosure. A synaptic connection may be implemented as a single memristor element 802. Transistors M1-M4 may represent switches, and transistors M5-M6 may represent synaptic current sensors. In addition, a switch S may be controlled by a slow clock phase CLK1. As illustrated in FIG. 8, a pre-synaptic training circuit 804 may comprise the switches M1-M2 and may be shared by all synapses connected to the same post-synaptic neuron. A post-synaptic training circuit 806 may comprise the switches M3-M4 and S and may be shared by all synapses connected to the same pre-synaptic neuron.

During spike transmission and reception on the CLK1 high phase, the switches M1 and S may be on, the switches M2-M4 may be off, and the transistor M5 may self-bias to accommodate a synaptic current 812 flowing through the memristor 802. A spike that is transmitted/received between a pair of neuron circuits may be a pre-synaptic spike (SP), which is illustrated in FIG. 8 by a pulse 808 of the SP signal 810. This pre-synaptic spiking event is also illustrated by a circuit 820, which represents a portion of the circuit 800 associated with this particular event. The voltage drop across the memristor 802, $V_S-V_{SG5}$, may be below a memristor threshold voltage $V_{T,mem}$ so that the memristance may not change during this event. The electrical current flowing through the transistor M5 may be proportional to the synaptic current 812, and may be mirrored into an input current 814 of a post-synaptic neuron.

Immediately following the spike 808, the switch S may be turned off. A pre-synaptic neuron may generate a potentiation enable (PE) signal on CLK2 high for its input synapses. Then, on CLK3 high, the same pre-synaptic neuron may generate a pulse 816 of a depression enable (DE) signal (illustrated in FIG. 8 as a DEB signal 818 which is an inverted DE signal), which may turn the switch M2 on. At the next CLK1 high after the pre-synaptic spike 808, the pre-synaptic neuron may reset its PWM counter and may start generating LTP and LTD training signals on CLK2 and CLK3 phases, respectively. The LTP training signal is illustrated in FIG. 8 by PWM pulses 822.

When a post-synaptic neuron spikes (e.g., represented by a pulse 824), this neuron may generate a PE pulse 826 on the CLK2 phase, immediately following the spiking CLK1 phase. If a pre-synaptic neuron is still generating its LTP PWM signals (e.g., pulses 822), then the post-synaptic PE pulse 826 may be aligned with one of the pre-synaptic LTP PWM pulses 822. This training event is illustrated in FIG. 8 by a circuit 830, which represents a portion of the circuit 800 associated with this particular event.

The switches M1 and M4 may be on at the same time for duration of one of the pre-synaptic LTP PWM pulses 822 aligned with the PE pulse 826. All other switches in the circuit 830 may be off. The voltage across the memristor 802 may have a positive value $V_p$, which may exceed the threshold voltage of the memristor (i.e., $V_P>V_{T,mem}$). Then, the synaptic current 812 may flow through the memristor 802 during the aligned PWM pulse 822 in a direction illustrated in the circuit 830 causing the memristance to increase, which may result in the LTP of the synaptic connection (i.e., the synapse weight may be increased).

On CLK3 phase following the post-synaptic spike 824, the post-synaptic neuron may generate a DE signal for its output synapses. At the next CLK1 high after the post-synaptic spike 824, the post-synaptic neuron may reset its PWM counter, and may start generating the LTP and LTD training signals on CLK2 and CLK3 phases, respectively. The LTD training signal generated by the post-synaptic neuron is illustrated in FIG. 8 by PWM pulses 828.

When the pre-synaptic neuron spikes again (as represented by a pulse 832), this neuron may generate PE and DE signals on the CLK2 and CLK3 phases, immediately following the spiking CLK1 phase. The DE pulse 834 (i.e., its inverted signal DEB) may turn the M2 switch on. If a post-synaptic neuron is still generating its LTD PWM signals at the M3 gate (e.g., pulses 828), then the pre-synaptic DE pulse 834 may be aligned with one of the PWM pulses 828. This training event is illustrated in FIG. 8 by a circuit 840, which represents a portion of the circuit 800 associated with this particular event.

The switches M2 and M3 may be on at the same time for duration of one of the post-synaptic LTD PWM pulses 828 aligned with the DE pulse 834. All other switches in the circuit 840 may be off. The voltage across the memristor 802 may be equal to a negative $V_D$, which may exceed the memristor threshold voltage (i.e., $V_D > V_{T,mem}$). Then, the synaptic current 812 may flow through the memristor 802 during the aligned PWM pulse 828 in a direction illustrated in the circuit 840 causing the memristance to decrease, which may result in the LTD of the synaptic connection (i.e., the synapse weight may be decreased). To implement a weaker depression t a potentiation for the same inter-spike interval, the power supply voltage $V_D$ may be chosen to be smaller than the power supply voltage $V_P$.

If pre-synaptic and post-synaptic spikes are aligned, then the corresponding synapse may be trained based on a relative timing of these spikes to previous spikes of the corresponding neurons. If the previous spikes occurred a long time ago and the PWM counters of both neurons already counted down to zero, then the coincident pre-synaptic and post-synaptic spikes may not change the corresponding synaptic weight. The neuron-to-neuron interface 800 illustrated in FIG. 8 can be modified such that the coincident spikes may not change the synaptic memristance (i.e., the synaptic weight) even if they happen shortly after previous spikes. In this case, the PWM counters may need either to be reset by the spike signal itself or by the PE signal rather than on the first CLK1 high following the spike.

Exemplary Single-Counter and Double-Counter PWM Generators

Figure 9A:
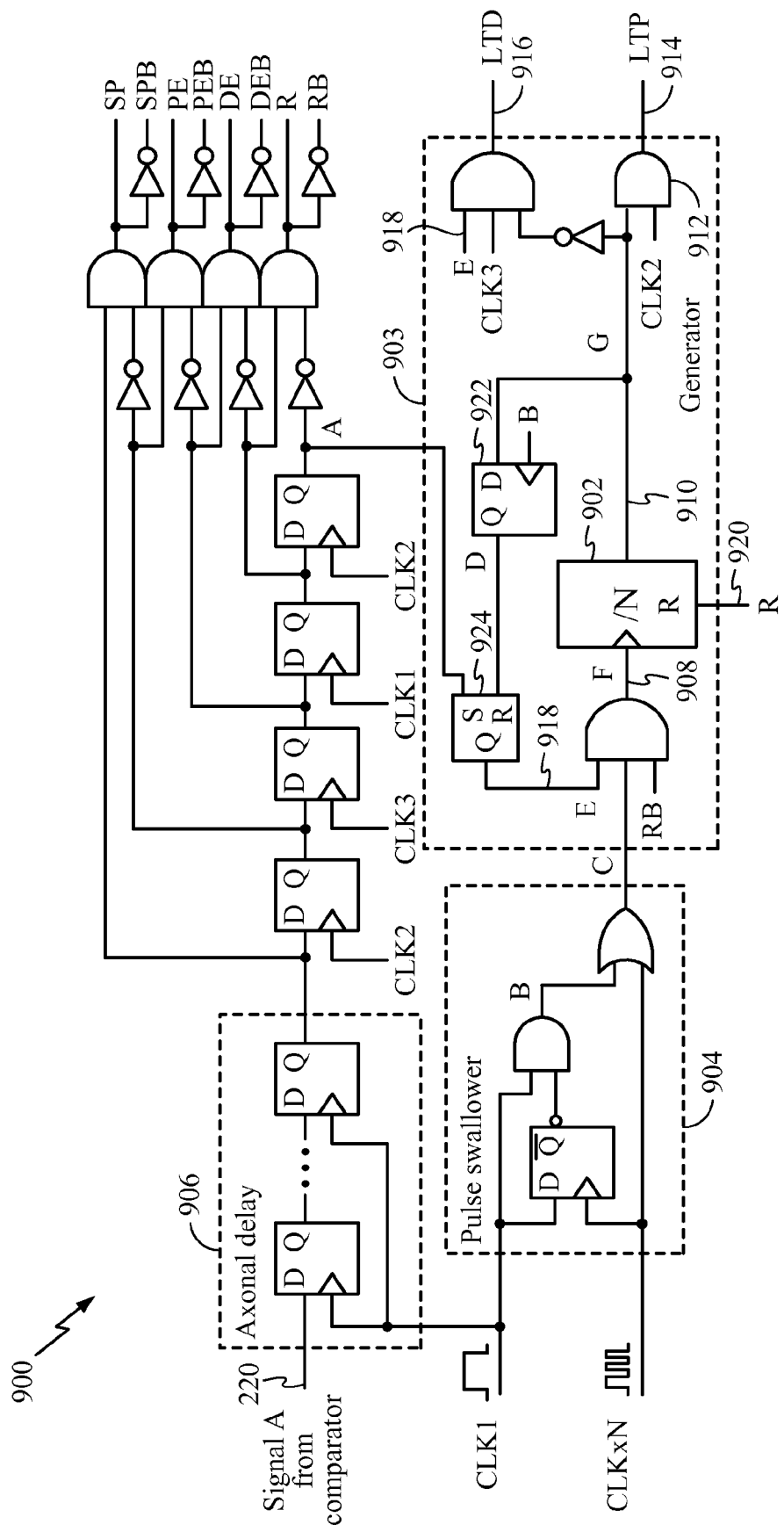
FIGS. 9A-9B illustrate an example of single-counter PWM generator that may be used for the synapse-training implementation from FIG. 8 in accordance with certain embodiments of the present disclosure.
Figure 9B:
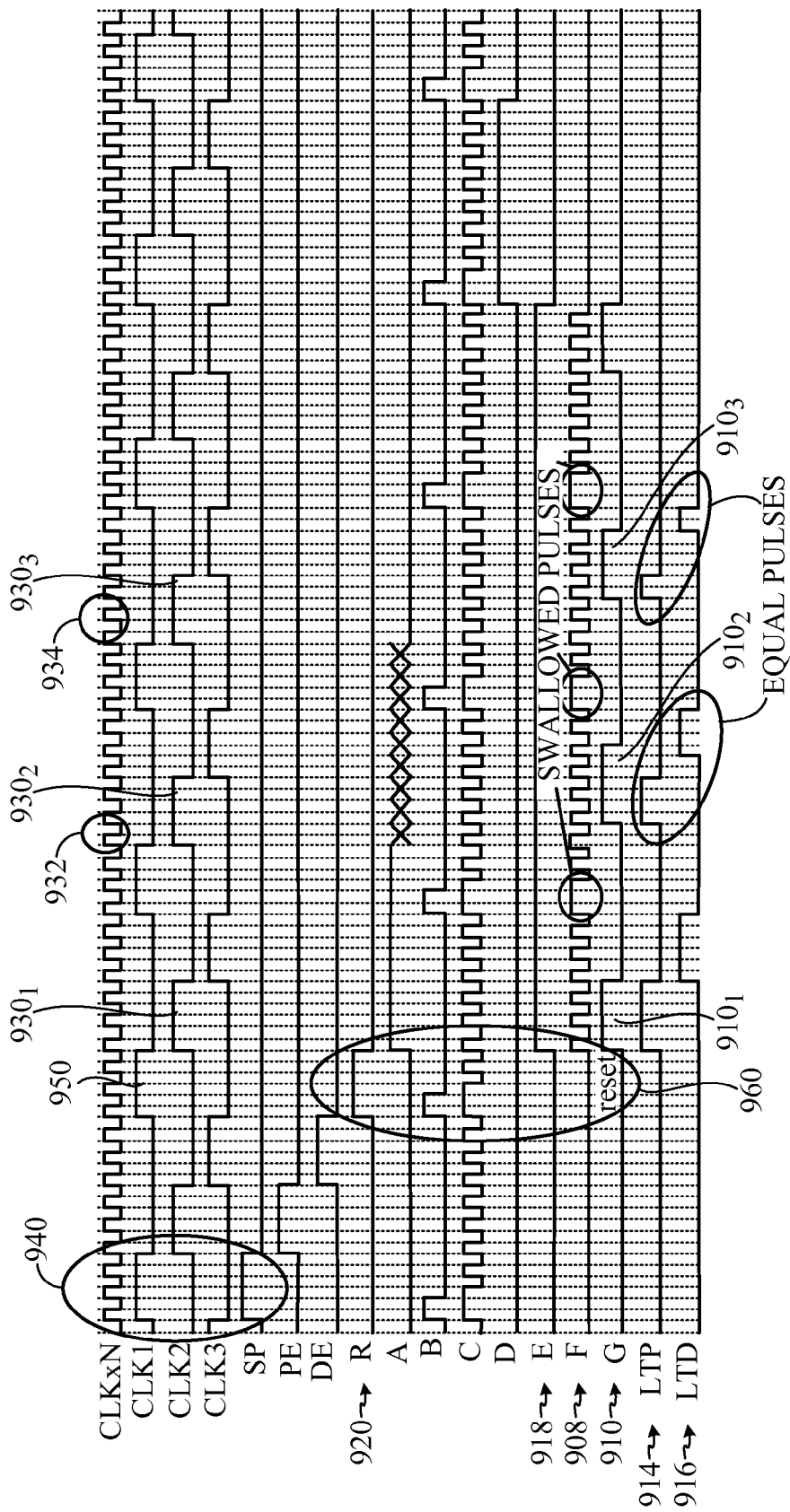

FIG. 9 illustrates an example of a single-counter PWM generator 900 that may be used for generating PWM training signals for the neuron-to-neuron interface 800 in accordance with certain embodiments of the present disclosure. It can be observed from FIG. 9 that the output signal 220 from the comparator 218 of the neuron circuit 202 from FIG. 2 may represent an input signal of the PWM generator 900. Implementation of the PWM generator 900 may be fully digital and based on an N-divider 902, a counter 903, a pulse swallower 904 and an axonal delay circuit 906, as illustrated in FIG. 9. The parameter N may be equal to a ratio of a fast-clock frequency to a slow-clock frequency.

The N-divider 902 may be clocked by a signal 908 representing a fast clock with a swallowed pulse every N fast cycles (i.e., swallowed pulse once every slow clock cycle), as illustrated in the timing diagram of FIG. 9 for the signal 908. Without the pulse swallower 904 but with proper resetting of the divider, the N-divider output pulses 910 may be aligned with the slow clock pulses. However, by employing the pulse swallower 904, only a first pulse $910_1$ of the N-divider output signal 910 may be aligned with a slow-clock pulse $930_1$, as illustrated in FIG. 9. A second pulse $910_2$ of the N-divider output signal 910 may appear one fast-clock cycle later (a fast-clock cycle labeled as 932 in FIG. 9) than a slow-clock pulse $930_2$, a third pulse $910_3$ of the N-divider output signal 910 may appear two fast-clock cycles later (fast-clock cycles labeled as 934 in FIG. 9) than a slow-clock pulse $930_3$, and so on. A logical AND operation 912 between the N-divider output 910 and CLK2 may result in an LTP PWM training signal 914. An LTD PWM training signal 916 may be generated by inverting the N-divider output 910 and multiplying it with CLK2 and a clock-gating signal 918, as illustrated in FIG. 9.

Operation of the N-divider 902 may be enabled by resetting the divider to zero by applying a signal 920 on a CLK1 phase 950 immediately following a spiking CLK1 phase 940, as illustrated in the timing diagram in FIG. 9. This resetting event is labeled as 960 in FIG. 9. After this reset, the clock gate 908 may be opened by the delayed spike signal 918. The divider 902 may count the fast-clock cycles until an end state is reached or until another delayed spike signal resets the counter. A D flip-flop 922 may be able to sense the last state and reset an SR trigger 924, which may also control the clock gate 908.

The drawback of the single-counter PWM generator 900 is that widths of the LTP and LTD pulses 914 and 916 may decay equally, as illustrated in FIG. 9. As aforementioned, the LTD weight adjustment may decay more slowly than the LTP weight adjustment. To implement different decay times for the LTP and LTD training signals, two counters may be required for implementation of a PWM generator.

Figure 10A:
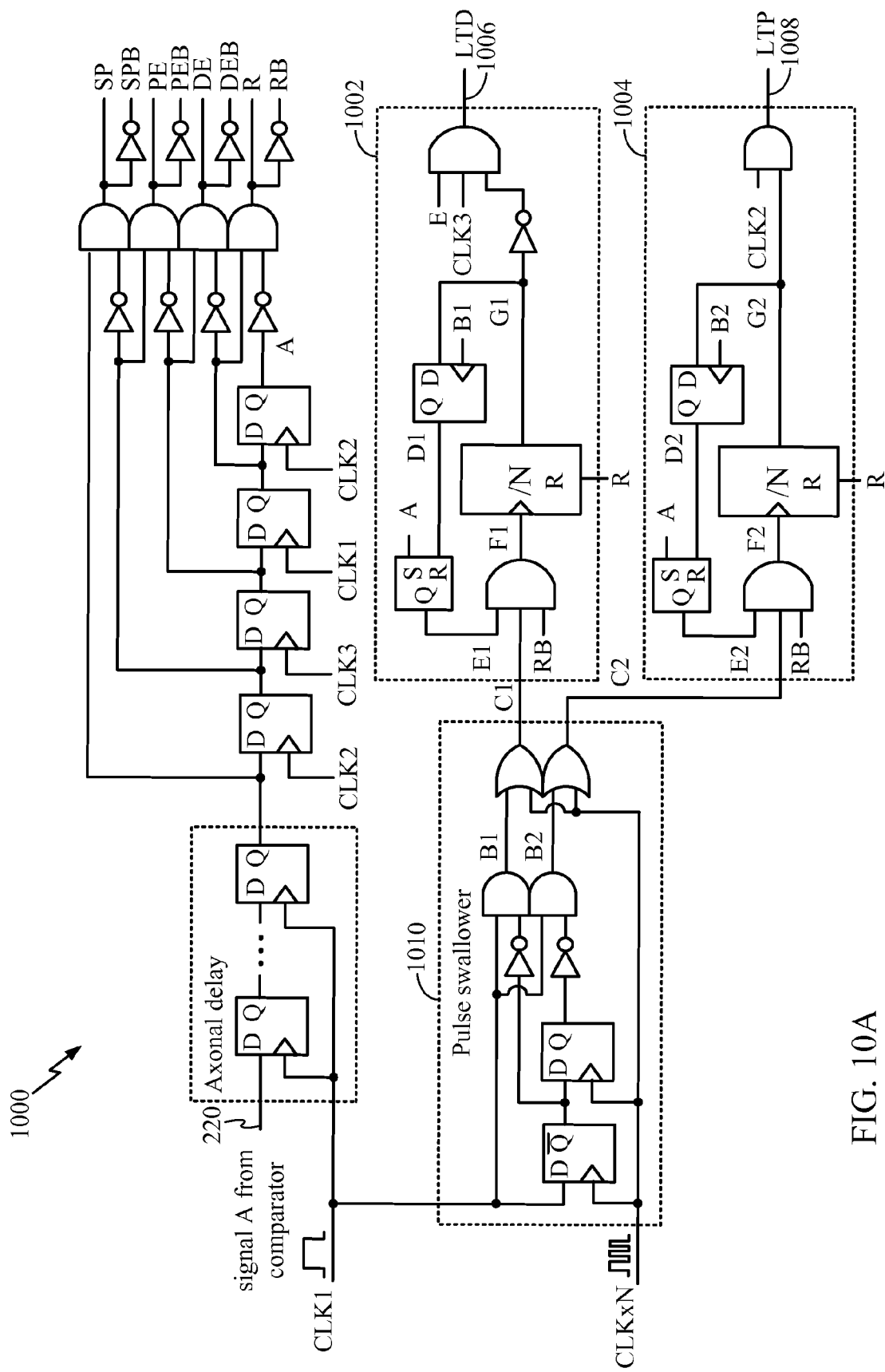
FIGS. 10A-10B illustrate an example of double-counter PWM generator that may be used for the synapse-training implementation from FIG. 8 in accordance with certain embodiments of the present disclosure.
Figure 10B:
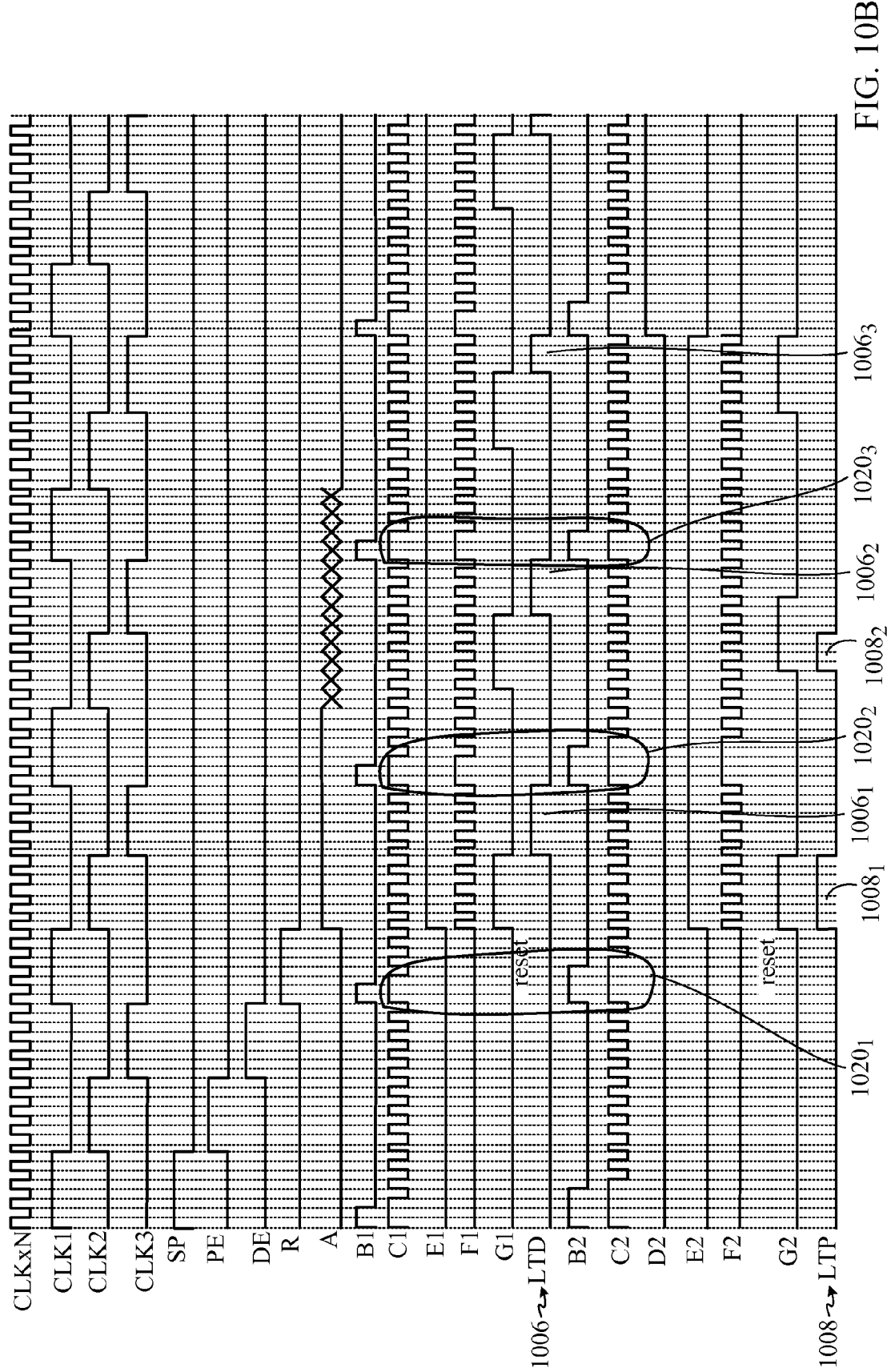

FIG. 10 illustrates an example double-counter PWM generator 1000 that may be used for generating PWM training signals for the neuron-to-neuron interface 800 from FIG. 8 in accordance with certain embodiments of the present disclosure. As illustrated in FIG. 10, a counter 1002 may be used to generate an LTD PWM training signal 1006, while another counter 1004 may be used for generating an LTP PWM training signal 1008.

Faster decay of the LTP pulses compared to the decaying of the LTD pulses (see, for example, pulses $1006_2$ and $1008_2$ in FIG. 10 where the LTP pulse $1008_2$ is narrower than the LTD pulse $1006_2$) may be achieved by swallowing more fast-clock pulses in the LTP counter 1004 compared to swallowed fast-clock pulses in the LTD counter 1002. This is, for example, illustrated in the timing diagrams in FIG. 10 by pulses $1020_1$, $1020_2$ and $1020_3$ of signals C1 and C2. A pulse swallower circuit 1010 may generate appropriate signals C1 and C2 that may be input into the LTD counter 1002 and the LTP counter 1004, respectively. Both the LTP and LTD counters may operate identically as the single counter 903 of the PWM generator 900, which is shown in FIGS. 9-10 by the identical timing diagrams associated with the counters 903, 1002 and 1004.

It should be noted that in the proposed neuron-to-neuron weight-training interface 800 illustrated in FIG. 8 only three phases of a slow clock signal may be utilized: one phase for the spike communication and two phases for the synapse training. As specified above, resistance of synaptic memristors may not be altered during spike transmissions because synapses may be trained on different clock phases from that used for the spike transmissions, and the voltage drop across the synaptic memristors during the spike transmissions may be below the memristor threshold voltage $V_{T,mem}$.

Further, training switches of the neuron-to-neuron interface 800 may be off (i.e., in the high-impedance state) and no electrical current may flow through a synaptic memristor in the absence of training events (which may be triggered by the PE and DE signals) despite the presence of PWM training signals in the corresponding pre-synaptic and post-synaptic neurons. This approach may be suitable for efficient hardware implementation resulting in a low current and power consumption. In addition, the PWM generators 900 and 1000 illustrated in FIGS. 9-10 may be implemented fully digitally since the usage of large integrating capacitors may be avoided.

Figure 11:
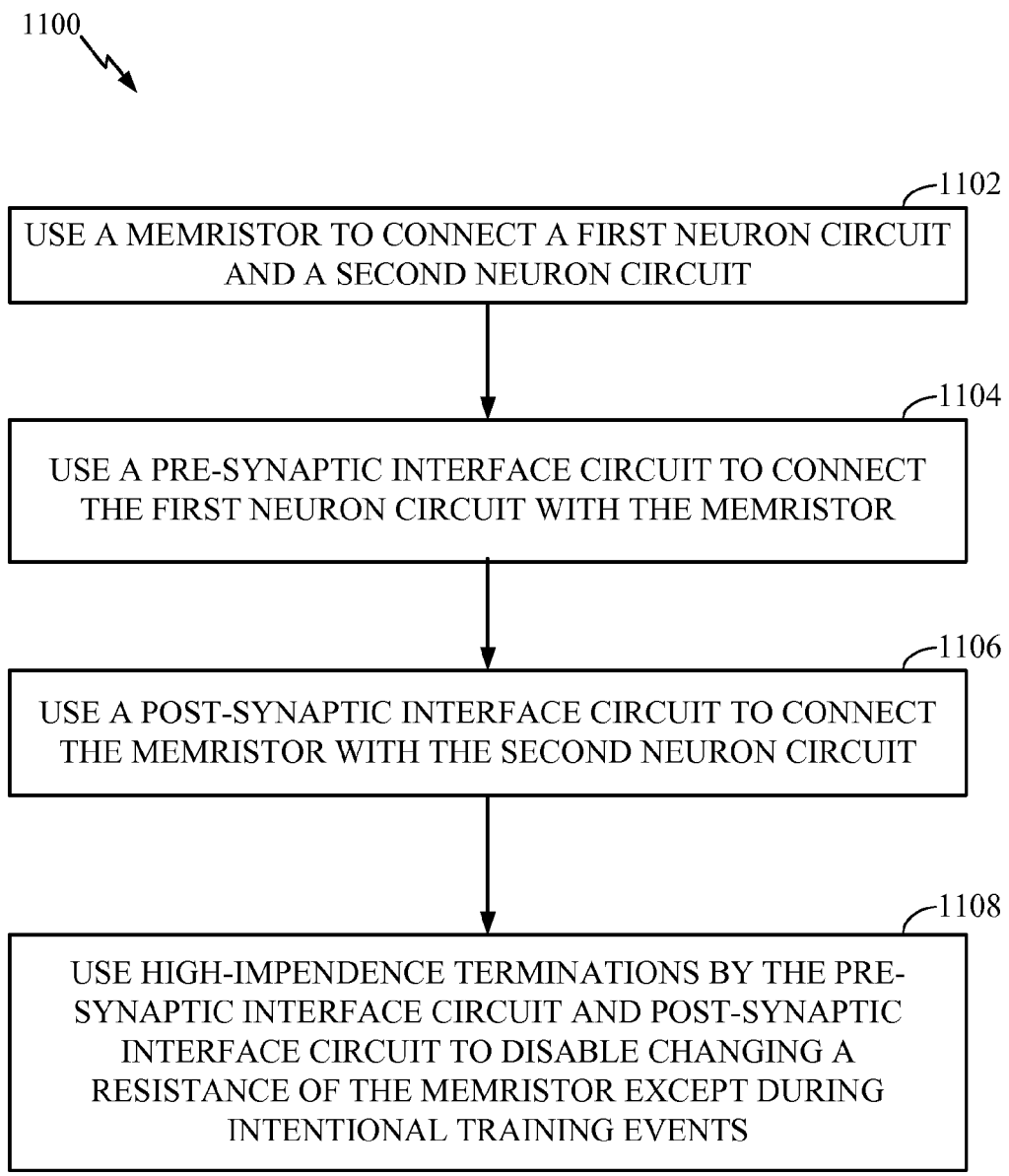
FIG. 11 illustrates example operations for implementing an electrical circuit for interfacing two or more neuron circuits in a neural system in accordance with certain embodiments of the present disclosure.

FIG. 11 illustrates example operations 1100 for implementing an electrical circuit for interfacing two or more neuron circuits of a neural system in accordance with certain embodiments of the present disclosure. At 1102, a memristor may be used to connect a first neuron circuit and a second neuron circuit. At 1104, a pre-synaptic interface circuit (e.g., the circuit 804 from FIG. 8) may be used to connect the first neuron circuit with the memristor. At 1106, a post-synaptic interface circuit (e.g., the circuit 806 from FIG. 8) may be used to connect the memristor with the second neuron circuit. At 1108, high-impedance terminations may be used by the pre-synaptic interface circuit and post-synaptic interface circuit to disable changing a resistance of the memristor except during intentional training events (i.e., the high-impedance terminations may facilitate selectively changing a memristor resistance).

As illustrated in FIG. 8, the pre-synaptic interface circuit may comprises a first set of switches, wherein at least one switch of the first set may change its state based on a first output pulse from the first neuron circuit, and wherein the change may cause a first electrical current flowing through the memristor, mirroring it into the second neuron circuit and setting a voltage across the memristor to be below a first threshold level. The post-synaptic interface circuit may comprises a second set of switches, wherein at least one switch of the second set may change its state during the training events based on a second output pulse from the second neuron circuit, and wherein the changes may cause a second electrical current flowing through the memristor and the voltage being constant and above a second threshold level, which may be the same or different than the first threshold level, or may be the same absolute value as the first threshold level, differing in the sign of the value. The high-impedance terminations may comprise preventing electrical current from flowing through the memristor if at least two signals are of such values that at least one switch of the first set and at least one switch of the second set are simultaneously turned off, wherein the at least two signals may be generated based on the first and second output pulses. Therefore, the high-impedance terminations may facilitate selectively changing a memristor resistance.

In general, a memristor element may comprise one or multiple threshold levels, wherein the threshold levels may be of different values and/or different absolute values for different directions in which electrical current may flow through the memristor. Additionally, one particular memristor may have one or more thresholds that are different than another particular memristor.

As illustrated in FIG. 8, the pre-synaptic interface circuit may be connected to a first plurality of memristors, wherein each memristor from the first plurality may be connected to a different post-synaptic neuron circuit via a different post-synaptic interface circuit, and wherein the post-synaptic neuron circuits may comprise the second neuron circuit. The post-synaptic interface circuit may connected to a second plurality of memristors, wherein each memristor from the second plurality may connected to a different pre-synaptic neuron circuit via a different pre-synaptic interface circuit, and wherein the pre-synaptic neuron circuits may comprise the first neuron circuit.

Figure 11A:
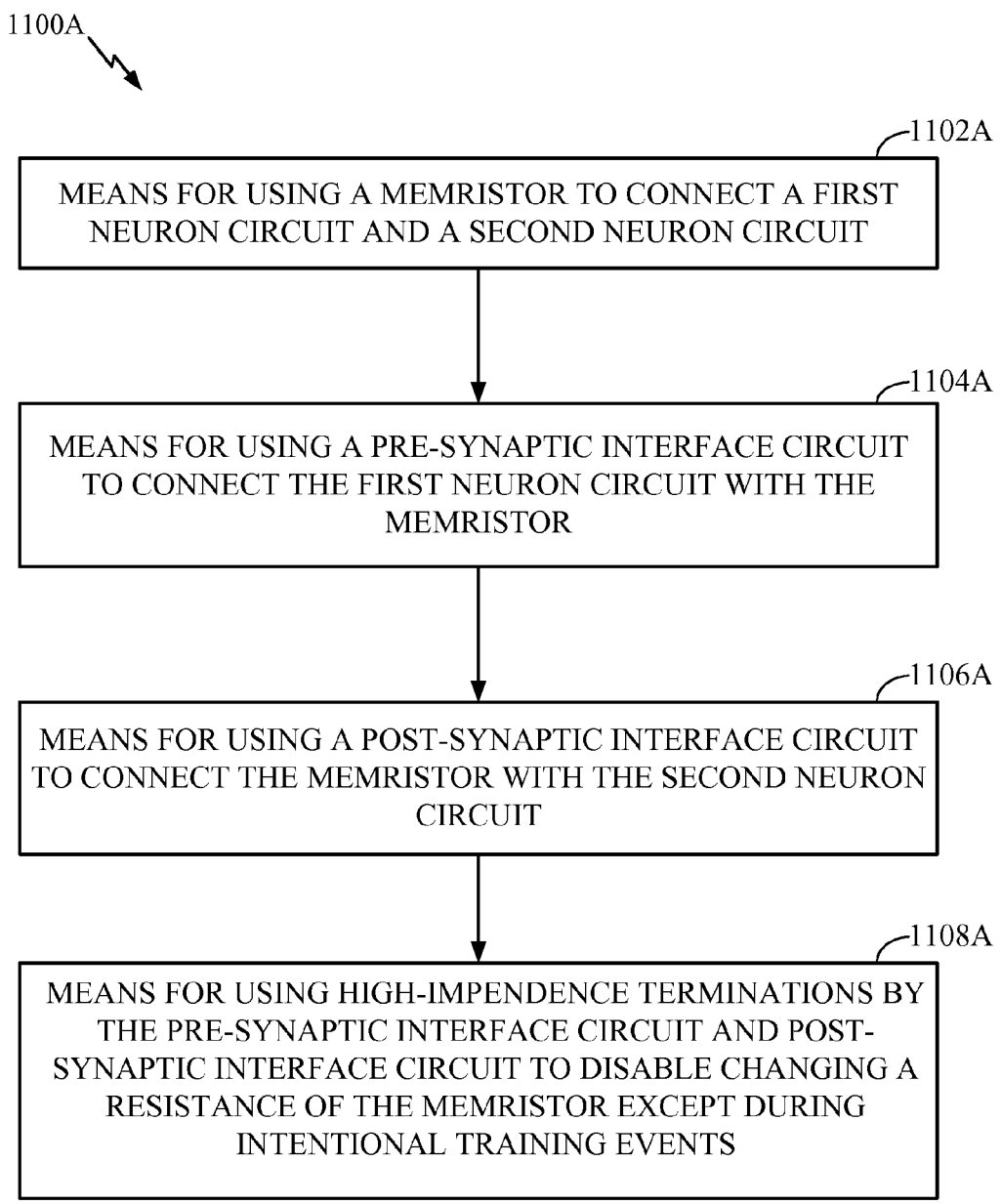
FIG. 11A illustrates example components capable of performing the operations illustrated in FIG. 11.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 1102-1108 illustrated in FIG. 11 correspond to means-plus-function blocks 1102A-1108A illustrated in FIG. 11A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-Ray® disc where disks usually reproduce data magnetically, while discs reproduce data optically with lasers.

Thus, certain embodiments may comprise a computer program product for performing the operations presented herein. For example, such a computer program product may comprise a computer readable medium having instructions stored (and/or encoded) thereon, the instructions being executable by one or more processors to perform the operations described herein. For certain embodiments, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. An electrical circuit for interfacing two or more neuron circuits of a neural system, comprising:
    a memristor connected between a first neuron circuit and a second neuron circuit;
    a pre-synaptic interface circuit connecting the first neuron circuit with the memristor; and
    a post-synaptic interface circuit connecting the memristor with the second neuron circuit, wherein
    the pre-synaptic interface circuit and post-synaptic interface circuit include high-impedance terminations configured to disable changing a resistance of the memristor except during intentional training events.

2. The electrical circuit of claim 1, wherein:
    the pre-synaptic interface circuit comprises a first set of switches, at least one switch of the first set changes its state based on a first output pulse from the first neuron circuit, and the change causes a first electrical current flowing through the memristor, mirroring it into the second neuron circuit and setting a voltage across the memristor to be below a first threshold level;
    the post-synaptic interface circuit comprises a second set of switches, at least one switch of the second set changes its state during the intentional training events based on a second output pulse from the second neuron circuit, and the changes cause a second electrical current flowing through the memristor and the voltage being constant and above a second threshold level; and
    the high-impedance terminations include preventing electrical current from flowing through the memristor if at least one switch of the first set of switches and at least one switch of the second set of switches are simultaneously turned off due at least in part to the first and second output pulses, respectively.

3. The electrical circuit of claim 2, wherein:
    the first output pulse is generated on a first pulse of a first clock signal of the electrical circuit,
    the first electrical current flows through the memristor during the first pulse of the first clock signal,
    the second output pulse is generated on a second pulse of the first clock signal after the first pulse, and
    the second electrical current flows through the memristor in a direction from the post-synaptic interface circuit to the pre-synaptic interface circuit causing the resistance of the memristor to increase, the direction is based on states of switches from the first and second sets controlled by pulses of a second clock signal of the electrical circuit.

4. The electrical circuit of claim 3, wherein:
    the second electrical current flows through the memristor in the direction during a portion of one of the pulses of the second clock signal, and
    duration of the flow of the second electrical current depends on a time difference between the first output pulse and the second output pulse.

5. The electrical circuit of claim 2, wherein:
    one or more switches of the first set change states based on a third output pulse from the first neuron circuit, and
    the changes caused by the second and third output pulses generate a third electrical current flowing through the memristor in a different direction than that of the second electrical current and cause the voltage to be constant and above a third threshold level.

6. The electrical circuit of claim 5, wherein:
    the second output pulse is generated on a pulse of a first clock signal of the electrical circuit,
    the third output pulse is generated on another pulse of the first clock signal after the pulse, and
    the third electrical current flows through the memristor in a direction from the pre-synaptic interface circuit to the post-synaptic interface circuit causing the resistance of the memristor to decrease, the direction is based on states of switches of the first and second sets controlled by pulses of a second clock signal of the electrical circuit.

7. The electrical circuit of claim 6, wherein:
the third electrical current flows through the memristor in the direction during a portion of one of the pulses of the second clock signal, and
duration of the flow of the third electrical current depends on a time difference between the second output pulse and the third output pulse.

8. The electrical circuit of claim 2, wherein the voltage across the memristor is based at least in part on states of switches from the first and second sets of switches and on power supplies of the electrical circuit.

9. The electrical circuit of claim 1, wherein:
the pre-synaptic interface circuit is connected to a first plurality of memristors, each memristor from the first plurality is connected to a different post-synaptic neuron circuit via a different post-synaptic interface circuit, the post-synaptic neuron circuits comprise the second neuron circuit, and
the post-synaptic interface circuit is connected to a second plurality of memristors, each memristor from the second plurality is connected to a different pre-synaptic neuron circuit via a different pre-synaptic interface circuit, the pre-synaptic neuron circuits comprise the first neuron circuit.

10. A method for implementing an electrical circuit interfacing two or more neuron circuits of a neural system, comprising:
connecting a memristor between a first neuron circuit and a second neuron circuit;
connecting the first neuron circuit with the memristor using a pre-synaptic interface circuit; and
connecting the memristor with the second neuron circuit using a post-synaptic interface circuit, wherein
the pre-synaptic interface circuit and post-synaptic interface circuit include high-impedance terminations configured to disable changing a resistance of the memristor except during intentional training events.

11. The method of claim 10, wherein:
the pre-synaptic interface circuit comprises a first set of switches, at least one switch of the first set changes its state based on a first output pulse from the first neuron circuit, and the change causes a first electrical current flowing through the memristor, mirroring it into the second neuron circuit and setting a voltage across the memristor to be below a first threshold level;
the post-synaptic interface circuit comprises a second set of switches, at least one switch of the second set changes its state during the intentional training events based on a second output pulse from the second neuron circuit, and the changes cause a second electrical current flowing through the memristor and the voltage being constant and above a second threshold level; and
the high-impedance terminations include preventing electrical current from flowing through the memristor if at least one switch of the first set of switches and at least one switch of the second set of switches are simultaneously turned off due at least in part to the first and second output pulses, respectively.

12. The method of claim 11, wherein:
the first output pulse is generated on a first pulse of a first clock signal of the electrical circuit,
the first electrical current flows through the memristor during the first pulse of the first clock signal,
the second output pulse is generated on a second pulse of the first clock signal after the first pulse, and
the second electrical current flows through the memristor in a direction from the post-synaptic interface circuit to the pre-synaptic interface circuit causing the resistance of the memristor to increase, the direction is based on states of switches from the first and second sets controlled by pulses of a second clock signal of the electrical circuit.

13. The method of claim 12, wherein:
the second electrical current flows through the memristor in the direction during a portion of one of the pulses of the second clock signal, and
duration of the flow of the second electrical current depends on a time difference between the first output pulse and the second output pulse.

14. The method of claim 11, wherein:
one or more switches of the first set change states based on a third output pulse from the first neuron circuit, and
the changes caused by the second and third output pulses generate a third electrical current flowing through the memristor in a different direction than that of the second electrical current and cause the voltage to be constant and above a third threshold level.

15. The method of claim 14, wherein:
the second output pulse is generated on a pulse of a first clock signal of the electrical circuit,
the third output pulse is generated on another pulse of the first clock signal after the pulse, and
the third electrical current flows through the memristor in a direction from the pre-synaptic interface circuit to the post-synaptic interface circuit causing the resistance of the memristor to decrease, the direction is based on states of switches of the first and second sets controlled by pulses of a second clock signal of the electrical circuit.

16. The method of claim 15, wherein:
the third electrical current flows through the memristor in the direction during a portion of one of the pulses of the second clock signal, and
duration of the flow of the third electrical current depends on a time difference between the second output pulse and the third output pulse.

17. The method of claim 11, wherein the voltage across the memristor is based at least in part on states of switches from the first and second sets of switches and on power supplies of the electrical circuit.

18. The method of claim 10, wherein:
the pre-synaptic interface circuit is connected to a first plurality of memristors, each memristor from the first plurality is connected to a different post-synaptic neuron circuit via a different post-synaptic interface circuit, the post-synaptic neuron circuits comprise the second neuron circuit, and
the post-synaptic interface circuit is connected to a second plurality of memristors, each memristor from the second plurality is connected to a different pre-synaptic neuron circuit via a different pre-synaptic interface circuit, the pre-synaptic neuron circuits comprise the first neuron circuit.

19. An apparatus for implementing an electrical circuit for interfacing two or more neuron circuits of a neural system, comprising:
means for connecting a memristor between a first neuron circuit and a second neuron circuit;
means for connecting the first neuron circuit with the memristor using a pre-synaptic interface circuit; and means for connecting the memristor with the second neuron circuit using a post-synaptic interface circuit, wherein
the pre-synaptic interface circuit and post-synaptic interface circuit include high-impedance terminations configured to disable changing a resistance of the memristor except during intentional training events.

20. The apparatus of claim 19, wherein:
the pre-synaptic interface circuit comprises a first set of switches, at least one switch of the first set changes its state based on a first output pulse from the first neuron circuit, and the change causes a first electrical current flowing through the memristor, mirroring it into the second neuron circuit and setting a voltage across the memristor to be below a first threshold level;
the post-synaptic interface circuit comprises a second set of switches, at least one switch of the second set changes its state during the intentional training events based on a second output pulse from the second neuron circuit, and the changes cause a second electrical current flowing through the memristor and the voltage being constant and above a second threshold level; and
the high-impedance terminations include preventing electrical current from flowing through the memristor if at least one switch of the first set of switches and at least one switch of the second set of switches are simultaneously turned off due at least in part to the first and second output pulses, respectively.

21. The apparatus of claim 20, wherein:
the first output pulse is generated on a first pulse of a first clock signal of the electrical circuit,
the first electrical current flows through the memristor during the first pulse of the first clock signal,
the second output pulse is generated on a second pulse of the first clock signal after the first pulse, and
the second electrical current flows through the memristor in a direction from the post-synaptic interface circuit to the pre-synaptic interface circuit causing the resistance of the memristor to increase, the direction is based on states of switches from the first and second sets controlled by pulses of a second clock signal of the electrical circuit.

22. The apparatus of claim 21, wherein:
the second electrical current flows through the memristor in the direction during a portion of one of the pulses of the second clock signal, and
duration of the flow of the second electrical current depends on a time difference between the first output pulse and the second output pulse.

23. The apparatus of claim 20, wherein:
one or more switches of the first set change states based on a third output pulse from the first neuron circuit, and
the changes caused by the second and third output pulses generate a third electrical current flowing through the memristor in a different direction than that of the second electrical current and cause the voltage to be constant and above a third threshold level.

24. The apparatus of claim 23, wherein:
the second output pulse is generated on a pulse of a first clock signal of the electrical circuit,
the third output pulse is generated on another pulse of the first clock signal after the pulse, and
the third electrical current flows through the memristor in a direction from the pre-synaptic interface circuit to the post-synaptic interface circuit causing the resistance of the memristor to decrease, the direction is based on states of switches of the first and second sets controlled by pulses of a second clock signal of the electrical circuit.

25. The apparatus of claim 24, wherein:
the third electrical current flows through the memristor in the direction during a portion of one of the pulses of the second clock signal, and
duration of the flow of the third electrical current depends on a time difference between the second output pulse and the third output pulse.

26. The apparatus of claim 20, wherein the voltage across the memristor is based at least in part on states of switches from the first and second sets of switches and on power supplies of the electrical circuit.

27. The apparatus of claim 19, wherein:
the pre-synaptic interface circuit is connected to a first plurality of memristors, each memristor from the first plurality is connected to a different post-synaptic neuron circuit via a different post-synaptic interface circuit, the post-synaptic neuron circuits comprise the second neuron circuit, and
the post-synaptic interface circuit is connected to a second plurality of memristors, each memristor from the second plurality is connected to a different pre-synaptic neuron circuit via a different pre-synaptic interface circuit, the pre-synaptic neuron circuits comprise the first neuron circuit.

28. A computer program product for interfacing two or more neuron circuits of a neural system, comprising a non-transitory computer-readable medium comprising code for:
connecting a memristor between a first neuron circuit and a second neuron circuit;
connecting the first neuron circuit with the memristor using a pre-synaptic interface circuit; and
connecting the memristor with the second neuron circuit using a post-synaptic interface circuit, wherein
the pre-synaptic interface circuit and post-synaptic interface circuit include high-impedance terminations configured to disable changing a resistance of the memristor except during intentional training events.

29. The computer program product of claim 28, wherein:
the pre-synaptic interface circuit comprises a first set of switches, at least one switch of the first set changes its state based on a first output pulse from the first neuron circuit, and the change causes a first electrical current flowing through the memristor, mirroring it into the second neuron circuit and setting a voltage across the memristor to be below a first threshold level;
the post-synaptic interface circuit comprises a second set of switches, at least one switch of the second set changes its state during the intentional training events based on a second output pulse from the second neuron circuit, and the changes cause a second electrical current flowing through the memristor and the voltage being constant and above a second threshold level; and
the high-impedance terminations include preventing electrical current from flowing through the memristor if at least one switch of the first set of switches and at least one switch of the second set of switches are simultaneously turned off due at least in part to the first and second output pulses, respectively.

30. The computer program product of claim 29, wherein:
the first output pulse is generated on a first pulse of a first clock signal of the neural system,
the first electrical current flows through the memristor during the first pulse of the first clock signal, the second output pulse is generated on a second pulse of the first clock signal after the first pulse, and the second electrical current flows through the memristor in a direction from the post-synaptic interface circuit to the pre-synaptic interface circuit causing the resistance of the memristor to increase, the direction is based on states of switches from the first and second sets controlled by pulses of a second clock signal of the neural system.

31. The computer program product of claim 30, wherein:

the second electrical current flows through the memristor in the direction during a portion of one of the pulses of the second clock signal, and duration of the flow of the second electrical current depends on a time difference between the first output pulse and the second output pulse.

32. The computer program product of claim 29, wherein:

one or more switches of the first set change states based on a third output pulse from the first neuron circuit, and the changes caused by the second and third output pulses generate a third electrical current flowing through the memristor in a different direction than that of the second electrical current and cause the voltage to be constant and above a third threshold level.

33. The computer program product of claim 32, wherein:

the second output pulse is generated on a pulse of a first clock signal of the neural system, the third output pulse is generated on another pulse of the first clock signal after the pulse, and the third electrical current flows through the memristor in a direction from the pre-synaptic interface circuit to the post-synaptic interface circuit causing the resistance of the memristor to decrease, the direction is based on states of switches of the first and second sets controlled by pulses of a second clock signal of the neural system.

34. The computer program product of claim 33, wherein:

the third electrical current flows through the memristor in the direction during a portion of one of the pulses of the second clock signal, and duration of the flow of the third electrical current depends on a time difference between the second output pulse and the third output pulse.

35. The computer program product of claim 29, wherein the voltage across the memristor is based at least in part on states of switches from the first and second sets of switches and on power supplies of the neural system.

36. The computer program product of claim 28, wherein:

the pre-synaptic interface circuit is connected to a first plurality of memristors, each memristor from the first plurality is connected to a different post-synaptic neuron circuit via a different post-synaptic interface circuit, the post-synaptic neuron circuits comprise the second neuron circuit, and the post-synaptic interface circuit is connected to a second plurality of memristors, each memristor from the second plurality is connected to a different pre-synaptic neuron circuit via a different pre-synaptic interface circuit, the pre-synaptic neuron circuits comprise the first neuron circuit.

* * * * *